US009338301B2

(12) United States Patent
Pocino et al.

(10) Patent No.: US 9,338,301 B2
(45) Date of Patent: *May 10, 2016

(54) DIGITAL LINKING OF MULTIPLE MICROPHONE SYSTEMS

(75) Inventors: Michael A. Pocino, Marietta, GA (US); Kwan K. Truong, Lilburn, GA (US)

(73) Assignee: Polycom, Inc., San Jose, CA (US)

( * ) Notice: Subject to any disclaimer, the term of this patent is extended or adjusted under 35 U.S.C. 154(b) by 1152 days.

This patent is subject to a terminal disclaimer.

(21) Appl. No.: 12/838,215

(22) Filed: Jul. 16, 2010

(65) Prior Publication Data
US 2010/0278358 A1  Nov. 4, 2010

Related U.S. Application Data

(63) Continuation of application No. 10/349,419, filed on Jan. 21, 2003, now Pat. No. 7,783,063.

(60) Provisional application No. 60/350,750, filed on Jan. 18, 2002.

(51) Int. Cl.
*H04B 1/00* (2006.01)
*H04M 3/56* (2006.01)
*H04R 3/00* (2006.01)

(52) U.S. Cl.
CPC ............ *H04M 3/562* (2013.01); *H04M 3/561* (2013.01); *H04M 3/568* (2013.01); *H04R 3/005* (2013.01)

(58) Field of Classification Search
CPC .......... H04R 3/005; H04R 27/00; H04R 3/00; H04R 2227/005; H04R 25/356; H04R 3/002; H04R 1/08; H04R 5/02; H04R 25/43; H04R 25/554; H04R 3/02

USPC .......... 381/92, 119, 122, 110, 98, 77, 56, 57, 381/104, 107, 80, 81, 111; 700/94; 379/202.01, 390.01–390.04; 704/200, 704/270, 275; 348/14.08, 14.09
See application file for complete search history.

(56) References Cited

U.S. PATENT DOCUMENTS 3,694,578 A   9/1972  Reid
3,755,625 A   8/1973  Maston
(Continued)

FOREIGN PATENT DOCUMENTS

| EP | 0 682 436 A2 | 11/1995 |
| WO | 9 416 517 | 7/1994 |
| WO | 9 746 048 A1 | 4/1997 |

OTHER PUBLICATIONS

IBM Technical Disclosure Bulletin; "Method of Endpoint Detection"; vol. 34, No. 9, Feb. 1992, pp. 267-269.*

(Continued)

*Primary Examiner* — Lun-See Lao
(74) *Attorney, Agent, or Firm* — Blank Rome, LLP

(57) ABSTRACT

Systems and methods for digitally linking multiple microphones and managing microphone signals are provided. Embodiments provide for digitally linking of multiple auto-mixer systems where a large number of microphones are required. In large auto-mixer systems, microphone input channels may be distributed among many devices. Rather than transmitting these signals individually to a central processing device for the auto-mixer, it is most efficient to distribute the audio signal processing functions of the automatic microphone mixer among multiple devices in an audio conferencing system. Subsequently, a smaller number of gated mixes of microphone signals may be transmitted between devices. Thus, embodiments of the present invention act to digitally link multiple microphone signals, arbitrating these signals, in order to enable distributed automatic microphone mixers to behave as a single mixer.

31 Claims, 20 Drawing Sheets

(56) References Cited

U.S. PATENT DOCUMENTS

| | | | |
|---|---|---|---|
| 4,149,032 A * | 4/1979 | Peters | 381/58 |
| 4,449,238 A * | 5/1984 | Lee et al. | 381/110 |
| 4,658,425 A | 4/1987 | Julstrom | |
| 4,961,211 A | 10/1990 | Tsugane et al. | |
| 5,060,273 A * | 10/1991 | Olah et al. | 381/119 |
| 5,121,426 A | 6/1992 | Baumhauer et al. | |
| 5,206,913 A | 4/1993 | Sims | |
| 5,259,035 A | 11/1993 | Peters et al. | |
| 5,301,185 A * | 4/1994 | Cherry | 370/216 |
| 5,483,528 A * | 1/1996 | Christensen | 370/263 |
| 5,506,910 A * | 4/1996 | Miller et al. | 381/103 |
| 5,561,737 A | 10/1996 | Bowen | |
| 5,631,967 A * | 5/1997 | Wagner et al. | 381/98 |
| 5,828,756 A | 10/1998 | Benesty et al. | |
| 5,848,146 A * | 12/1998 | Slattery | 379/406.01 |
| 5,858,756 A | 1/1999 | Hillman | |
| 5,991,385 A | 11/1999 | Dunn et al. | |
| 6,049,607 A | 4/2000 | Marash et al. | |
| 6,173,059 B1 | 1/2001 | Huang et al. | |
| 6,408,327 B1 | 6/2002 | McClennon | |
| 6,496,201 B1 | 12/2002 | Baldwin et al. | |
| 6,618,073 B1 | 9/2003 | Lambert | |
| 6,788,337 B1 | 9/2004 | Fujii | |
| 6,850,496 B1 * | 2/2005 | Knappe et al. | 370/260 |
| 6,895,093 B1 | 5/2005 | Ali | |
| 7,006,616 B1 * | 2/2006 | Christofferson et al. | 379/202.01 |
| 7,012,630 B2 * | 3/2006 | Curry et al. | 348/14.08 |
| 7,260,231 B1 | 8/2007 | Wedge | |
| 7,333,622 B2 | 2/2008 | Algazi et al. | |
| 7,515,721 B2 | 4/2009 | Tashev et al. | |
| 7,783,063 B2 * | 8/2010 | Pocino et al. | 381/119 |
| 2003/0118200 A1 | 6/2003 | Beaucoup et al. | |
| 2004/0263636 A1 | 12/2004 | Cutler et al. | |

OTHER PUBLICATIONS

International Search Report for Corresponding PCT Case, Serial No. PCT/US03/01974. Jan. 21, 2003.

Supplementary European Search Report received in corresponding application No. EP 03 72 9692 dated Aug. 21, 2008.

First Examination Report dated Nov. 25, 2009, Government of India Patent Office; Application No. 1345/DEL/2005.

European Search Report dated Aug. 18, 2009 for corresponding Application No. 05011660.7-2225 / 1613124.

Looperman Audio Resources; "Mixing—Panning for Gold"; www.looperman.com/tutorials_mixing_nanning_for_gold.php.

* cited by examiner

DIGITAL LINKING OF MULTIPLE MICROPHONE SYSTEMS

CROSS REFERENCE TO RELATED APPLICATION

This application is a continuation application of U.S. patent application Ser. No. 10/349,419, entitled "Digital Linking Of Multiple-Microphone Systems", filed Jan. 21, 2003, which in turn claims priority to U.S. Provisional Patent Application No. 60/350,750 entitled "Digital Linking of Multi-Microphone System for Teleconference Systems," filed Jan. 18, 2002. The entire contents of each of these applications are hereby incorporated herein by reference.

BACKGROUND OF THE INVENTION

1. Field of the Invention

The present invention relates generally to the field of audio conferencing and audio conferencing systems, and more particularly to digital linking of multiple auto-mixer systems.

2. Background of the Invention

In audio conferencing systems where more than one microphone is used, auto-mixing helps to enhance overall system sound quality by selectively turning on (opening) the microphones that contains strong signal activities (e.g., speech, music, etc.) and turning off (closing) those microphones that contain relatively insignificant signal activities (e.g., background noise, etc.). Auto-mixers are used to enable sound capture devices such as a microphone. Auto-mixers can selectively enable and disable microphones in an audio conference and can modify attenuation of audio signals. Conventional audio conferencing systems often implement auto-mixing in systems with numerous devices, thus creating overly complex and burdensome audio conferencing systems. In conventional systems, there is significant difficulty coordinating multiple devices with multiple auto-mixers. Analog mixers support linking, but fail to support additional features or options beyond merely linking signals. Conversely, conventional digital auto mixers do not perform as well or do not provide linking capabilities.

Conventionally, an auto-mixer is designed to improve the speech of active participants in an audio conference, rendering the audio-conferenced sounds to be more intelligible (due to, e.g., less comb filtering effects, lower ambient noise level, less reverberant effects, etc.), but also helps to prevent the conferencing system from howling.

In large auto-mixer systems, microphone input channels may be distributed among many devices. Rather than transmitting these signals individually to a central processing device for auto-mixing, greater efficiency is gained by distributing audio signal processing functions of an auto-mixer among multiple devices in an audio conferencing system. Subsequently, a smaller number of gated mixes of microphone signals may be transmitted between devices.

With regard to noise levels, noise thresholds are used to determine whether a microphone is experiencing signal activity. In general, noise threshold determination is based on an adaptive noise floor measurement (automatically or manually adjusting threshold). In many implementations, the speech (or other sound) should be a certain number of dB louder than the noise floor. This dB difference is sometimes called the "adaptive threshold," which may be adjustable by the user.

One approach to circumvent the acoustic feedback problems associated with gating multiple microphones is to use a smaller system gain as more microphones are added to the system. In other words, by reducing the system gain, for example, number of microphones (NOM) count can be increased to permit more microphones to be gated open before feedback occurs. Experimental studies have shown that for each doubling of the number of microphones added to the system, the system gain should, in many cases, be lowered by 3 dB to avoid feedback. Limiting the maximum NOM count may also help to prevent feedback.

In some cases, noise in an area with microphones may have widely-varying signal amplitudes and can create a false indication at the auto-mixer that noise activity exists near one or more microphones. Actual average noise levels, however, may be at low levels. In an environment that is otherwise relatively devoid of other sounds or noise activity, an intermittent noise fluctuation may generate sufficient sound signal activity so as to exceed the noise floor measurement, resulting in a microphone turning on. Thus, the fluctuating noise may be sufficient to trigger an auto-mixer and gate a microphone into an open state. Even though the fluctuating noise is at a low level, the peak noise level may be high enough above the average noise level to gate one or more proximate microphones into an open state.

As also mentioned herein, some conventional auto-mixing systems are capable of linking. Linking enables multiple auto-mixers to share signals, information, and parameter data for the purpose of mixing signals from assigned microphones. Linking of multiple auto-mixers enables a mixed signal output. For example, where two auto-mixers exist, each auto-mixer may have eight microphones assigned and sound signal activity may be picked up by microphones assigned to the auto-mixers. Although there are two auto-mixers in the given example, by linking them, sound signals picked up from the sixteen assigned microphones can be shared and mixed to produce an arbitrary number of sound signal outputs. Thus, in turn, can be used to increase the quality of the sounds in, for example, an audio conferencing scenario. However, conventional systems are problematic and cannot perform gating logic functions, option control logic, and arbitration between local and remote microphones. Conventional linking is accomplished using analog signals which are not capable of performing gating logic functions.

In conventional audio mixing systems, limitations exist in a single complex and expensive auto-mixer (where automatic mixing and linking is irrelevant). In the context of conventional digital linking systems, seamless linking capabilities do not exist. Most of the prior art concerning auto-mixers are implemented in analog circuitry. While many of these auto-mixers are capable of linking, the link is accomplished with analog signals which are rather simple and not capable of many desired functions. Digital implementations are either designed in a single large device (where auto-mixer linking is not needed), or do not have the seamless linking capabilities that are desired.

Therefore, there is a need for a system for digital linking of multiple microphones where features and functionality of the multiple microphone systems are linkable.

SUMMARY OF THE INVENTION

The present invention provides in various embodiments an auto-mixer system suitable for use in applications such as audio conferencing. Various embodiments provide for digital linking of multiple auto-mixer systems where a large number of microphones are required for such applications as large-venue audio conferences in auditoriums, theaters, conference rooms, convention centers, meeting halls, etc.

In one embodiment according to the present invention, there is provided a method of managing microphone signals.

The method comprises comparing levels of a plurality of microphone signals, where each microphone signal corresponding to a microphone, to a threshold noise floor level. Then, microphones are turned off for which a level of a respective microphone signal is less than a threshold noise floor level. Subsequently, a primary microphone is determined based on a long term histogram. Finally, using a short term histogram, zero or more secondary microphones are identified.

It is desirable that these distributed automatic microphone auto-mixers behave as a single auto-mixer. In other words, microphone channels connected to multiple devices can interact in the same manner as microphone channels in a single device for both basic gating functionality and gating logic functions. Embodiments according to the present invention permit an arbitrary number of distributed automatic microphone auto-mixers to be linked in a seamless manner, with a minimum amount of data required to be transmitted between devices. Further, exemplary embodiments of an automatic microphone auto-mixer permit turning on microphones to pick up signal activity per one or more participants. Where more than one participant is present, then an appropriate number of microphones are activated to pick up speech signal activity from multiple participants. When the automatic microphone auto-mixer determines that one or more microphones are not required, then these microphones are deactivated thus attenuating speech signal volume picked up and processed by embodiments of the present invention.

Embodiments of the present invention send packets of parameters between auto-mixers with maximum signal level information and a bit field with option information, over the same digital channel as a primary audio signals. This creates the same effect among multiple auto-mixer-enabled devices as though the multiple devices have been implemented into a single device.

A further understanding of the nature and advantages of the inventions herein may be realized by reference to the remaining portions of the specification and the attached drawings.

DESCRIPTION OF THE EXEMPLARY EMBODIMENTS

Figure 1:
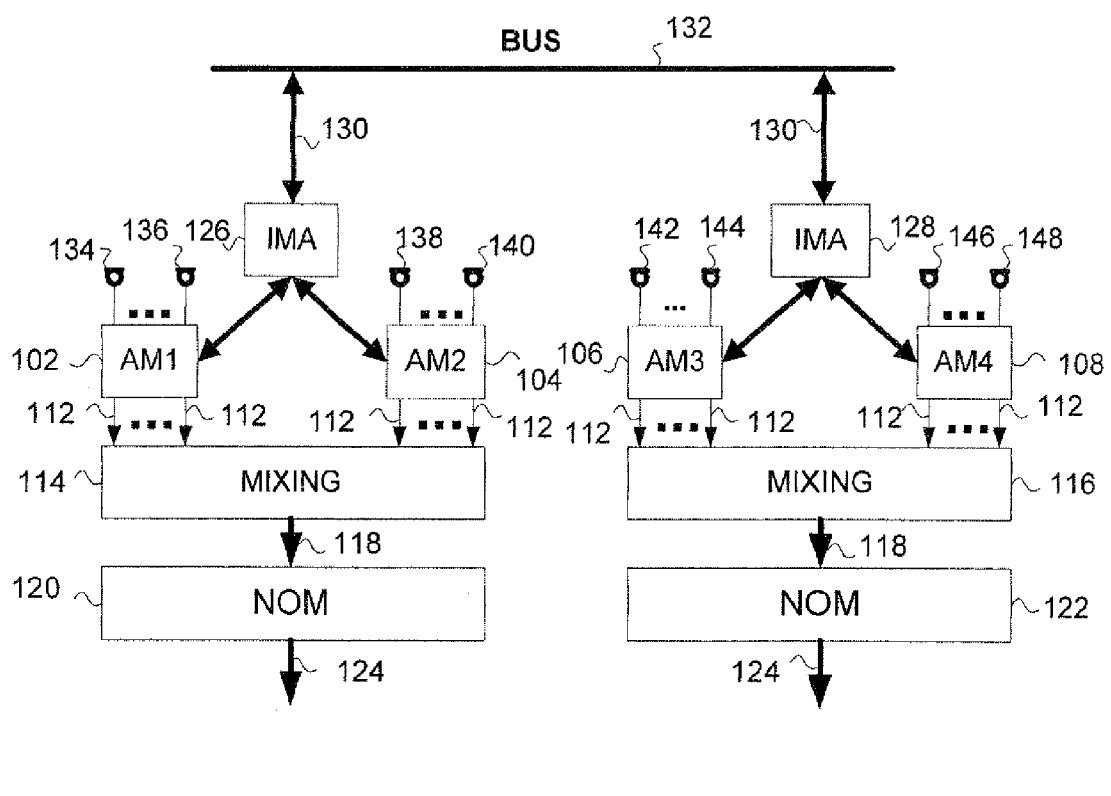
FIG. 1 is an exemplary block diagram of auto-mixers communicating with a digital linked IMA.

As shown in the exemplary drawings wherein like reference numerals indicate like or corresponding elements among the figures, an exemplary embodiment of a system according to the present invention will now be described in detail. The following description sets forth an example of an auto-mixer system, suitable for use in audio conferencing or other suitable applications. Embodiments according to the present invention provide for the digital linking of multiple auto-mixer systems where a large number of microphones are required for such applications as large conference rooms, churches, auditoriums, etc. Further, digital linking of multiple microphone systems, such as embodiments of the present invention, permit gating logic options and functions that conventional systems do not perform.

In an embodiment of an auto-mixer, each microphone channel is analyzed and noise activity is evaluated based on thresholding techniques, and a nearest microphone is selected based on a pre-defined set of rules. Activity measurements are taken which may include a speech level, a noise level, or other measurement related to the sound activity of a microphone. A gating process is employed to choose a best microphone out of a set of microphones that are eligible for activation. Gating options can be chosen by executing processes embodied by the present invention and described herein. Gating options may include, for example, the results of gating logic sequences described herein, gating option logic parameters, decisions as to whether to gate open or close a particular microphone, or decisions as to whether to permit a microphone to be gated open, given a user-specified limit to the number of allowable open microphones. Alternatively, other gating options may be envisioned by one of ordinary skill in the art and are not limited exclusively to those described herein. Additional gating logic may be used to place restrictions on which microphones can be activated. Once the active microphones are chosen, attenuation is applied to each channel based on whether the channel is on, off, or in transition. After mixing a number of open microphones (NOM) attenuation may be applied.

In each device of an exemplary embodiment of the system, one or more automatic microphone auto-mixers may be present. FIG. 1 illustrates a block diagram of a digitally linked multiple microphone system 100 with a plurality of auto-mixers in accordance with an embodiment of the present invention. Auto-mixers 102 (AM1), 104 (AM2), 106 (AM3), and 108 (AM4) are shown receiving input signals from microphones 134-148. The input signals from microphones 134-148 and gated output signals 112 represent an arbitrary number of signals. The input signals from microphones 134-148 may represent signals from, for example, only one microphone 134 or a plurality of microphones 134-136 assigned to auto-mixer 102. Although the present embodiment shows four auto-mixers, alternatively, any number of auto-mixers may be utilized.

In turn, after the auto-mixers 102-108 have mixed the input signals from microphones 134-148, gated output signals 112 are sent to matrix mixing blocks 114 and 116. In the FIG. 1 embodiment, the auto-mixers 102 and 104 communicate with the matrix mixing block 114 while the auto-mixers 106 and 108 communicate with the matrix mixing block 116. The matrix mixing blocks 114 and 116 mix open microphone signals received by the auto-mixers 102-108. Subsequently, mixed output signal 118, which may comprise one or more signals mixed by the matrix mixing blocks 114 and 116, is sent to number of open microphone (NOM) attenuators 120, 122. NOM represents the number of open microphones or microphones that are gated open. NOM attenuated signals 124 are then generated, and then sent to an output device, such as a telephone line, a loudspeaker, an audio conferencing speakerphone, or another audio device envisioned by one of ordinary skill in the art. The NOM attenuators 120 attenuate each output by a corresponding amount based upon the number of open microphones.

Inter-mixer arbitrators (IMA) 126 and 128 are coupled to and receive data packets from the auto-mixers 102-108. Signals may be resolved into data packets which are selected by the auto-mixers 102-108 and classified according to a bus group communicated via a bus 132. Based on the data packets received from the auto-mixers 102-108, the IMAs 126 and 128 determine bus group classifications as well as auto-mixer responsibilities for those bus group-classified signals. The IMAs 126 and 128 can also arbitrate signals between auto-mixers not within the immediate system. For example, although the IMA 126 arbitrates signals from the auto-mixers 102 and 104, arbitration is also enabled between the auto-mixers 106 and 108 via the bus 132.

In one embodiment, the bus 132 is a high-speed, low delay digital bus which shares information between the components of the systems as shown. Information which can be shared includes microphone input data, NOM data, or other parameter data that may be necessary to operations such as linking. However, other embodiments of the present invention are not limited to the types of information or operations disclosed herein. One of ordinary skill in the art may include other types of information or operations as necessary to implementing alternative embodiments of the present invention. Communicating via the bus 132, the digitally-linked IMAs 126 and 128 can arbitrate signals from multiple auto-mixers coupled to multiple microphones.

The IMAs 126 and 128 evaluate each of the auto-mixers 102-108 to determine and classify signals, information, or data packets. Thus, the IMA 126 arbitrates signals between the auto-mixers 102 and 104. If the IMA 126 determines that a particular bus group of data packets is pertinent to the auto-mixer 102, then the IMA 126 evaluates data signals from the auto-mixers 104-108 to determine whether any signals or data packets are relevant to the auto-mixer 102. Should the IMA 126 determine that the auto-mixers 104-108 are mixing or receiving data signals which are classified similar to the data packets being mixed by the auto-mixer 102, then this data is arbitrated by the IMA 126 and sent to the auto-mixer 102. However, if the data packets or signals do not fall under the bus group classification identified for the auto-mixer 102, then the IMA 126 will not arbitrate this data or direct the data to the auto-mixer 102 for mixing. In a similar manner, the IMA 126 also arbitrates signals for the auto-mixer 104. Further, the IMA 128 will arbitrate signals and data packets for the auto-mixers 106 and 108.

During the arbitration process, the IMA 126 receives audio signals over one or more processed microphone channels. These audio signals are mixed, possibly with other audio sources and audio signals communicated from remote devices over the bus 132. Mixed audio signals are output to one or more mixing blocks (illustrated in FIG. 1 as mixing blocks 114 and 116). The outputs of the mixing blocks 114 and 116 may also have NOM attenuation applied, depending on a current, requested, and total NOM count for all relevant auto-mixer groups. The IMA 126 interfaces between the local auto-mixers 102 and 104 and the remote auto-mixers 106 and 108, communicating over bus 132. The IMA 126 also processes relevant data packets from the bus 132 (i.e., data from linked local and remote auto-mixers 102-108).

Not all data is immediately relevant and not all auto-mixers are necessarily relevant to the IMA 126's current arbitration process. For example, the IMA 126 may be arbitrating signals for the auto-mixer 102 and the local microphones which share a common identification or ID number. Microphones from the other local auto-mixer 104 and the remote auto-mixers 106 and 108 may or may not share the same identification or ID number. In the case where the ID number of the other auto-mixers 104-108 are identical to the ID of auto-mixer 102, then IMA 126 arbitrates and instructs the auto-mixers 104-108 to mix signal and packet data.

From this data, the IMA 126 generates supervisory control parameters, which modify the behavior of a state machine, as described below in connection with FIG. 2A, and gating logic of an exemplary auto-mixer, as illustrated below in FIG. 2A.

Figure 2A:
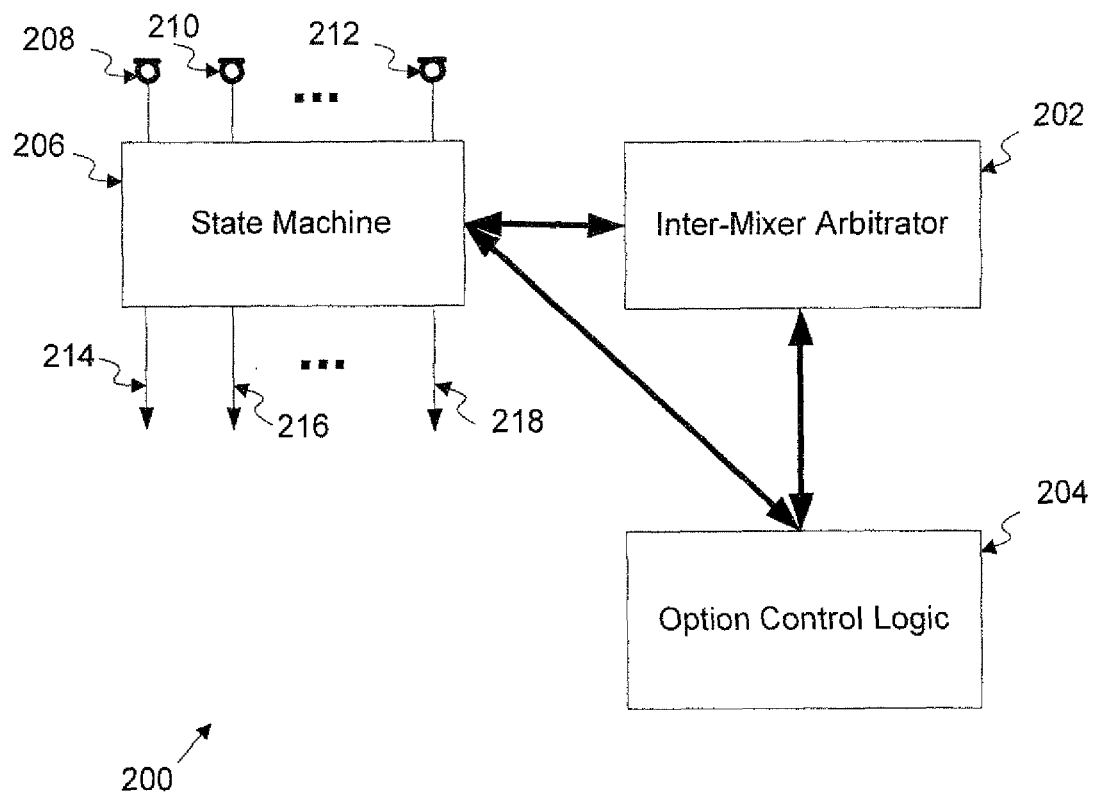
FIG. 2A is an exemplary block diagram of an auto-mixer.

Referring to FIG. 2A, an exemplary IMA 202 is shown in communication with an option control logic module 204 and a state machine 206. The exemplary IMA 202 may be the IMA 126 or 128 of FIG. 1. Microphone inputs 208, 210, and 212 are shown providing input signals to the state machine 206 which, in turn, produces gated outputs 214, 216, and 218.

In accordance with one embodiment of the present invention, each auto-mixer, such as the auto-mixers 102-108 described in FIG. 1, contain one or more state machines 206 and one or more option control logic modules 204. Although the single state machine 206 and the single option control logic module 204 are shown in FIG. 2A, in alternative embodiments, multiple state machines and multiple signal option control logic modules can be envisioned.

Both the state machine 206 and the option control logic module 204 aid the IMA 202 by communicating necessary information for arbitrating, classifying, and resolving which signals should be mixed by particular auto-mixers. Included within the information exchanged between the IMA 202 and the option control logic module 204 is a data or bit field which enables the execution of options and modes such as "chairman mic" and "last mic on" among others, which will be described in greater detail below.

Bit fields containing data may indicate as to whether a specific option or mode is enabled. For example, in the case of "chairman mic," when a microphone is designated as a chairman mic, the microphone is given priority over all other microphones in the system. That is, when a chairman mic is active, gating of all other microphones is inhibited. Thus, the chairman mic mode permits one microphone to be given priority for sending inputs to the auto-mixer (e.g., auto-mixer 102) for priority processing above all other inputs to the system.

In another example, the "last mic on" mode, which may also be referred to as the "last mic hold" mode, causes at least one microphone to stay open at all times. Most often, this is the last microphone to have speech activity. In some embodiments of the present invention, the auto-mixers 102-108 may permit a chairman mic to be the default microphone designated as the last microphone rather than the most recently active microphone. In other embodiments of the present invention, only one microphone is held open for the entire system. In further embodiments where particular areas within a room (i.e., "zones") are implemented, it may be desirable to hold only one mic open for each zone. In still another embodiment, a microphone may be held open for each device, assuming a multiple device-implementation exists wherein multiple auto-mixers and IMAs are present. However, there may be additional embodiments not presented here but which may be envisioned by one of ordinary skill in the art. The present invention is not intended to be limited to only those implementations discussed above.

In the FIG. 2A embodiment, the state machine 206 decides which microphones are gated open based upon activity levels while the option control logic module 204 determines which modes or options are implemented. These modes or options can be communicated directly to the state machine 206. As previously discussed, the state machine 206 receives audio signal inputs from the microphones 208, 210, and 212 and outputs the gated signals 214, 216, and 218. The state machine 206 also outputs audio information to other components of the system such as that of FIG. 1, but also receives control signals from both the IMA 202 and the option control logic module 204. The control signals aid the system in determining the control options such as mixing parameters and which channels to gate open or closed. The state machine 206 is also responsible for gating output information from the auto-mixers 102-108 (see FIG. 1).

The IMA 202 communicates short-term and long-term maximum speech levels with the state machine 206 and the option control logic 204. Further, the IMA 202 communicates control options between both the state machine 206 and the option control logic module 204 such as "chairman mic" and "last mic on" modes, as discussed above. Other control options and methods for determining and arbitrating maximum and minimum speech levels can be embodied in alternative embodiments of the present invention.

In one embodiment of the present invention, the IMA 202 is implemented in software. In alternative embodiments, the IMA 202 may be implemented in hardware, software, or a combination of both, but is not limited to only the embodiment discussed below. In a software-implemented embodiment, the IMA 202 enables mixing, signal arbitration, and control options as discussed below. Further detail of the IMA 202 is provided in FIG. 2B.

Figure 2B:
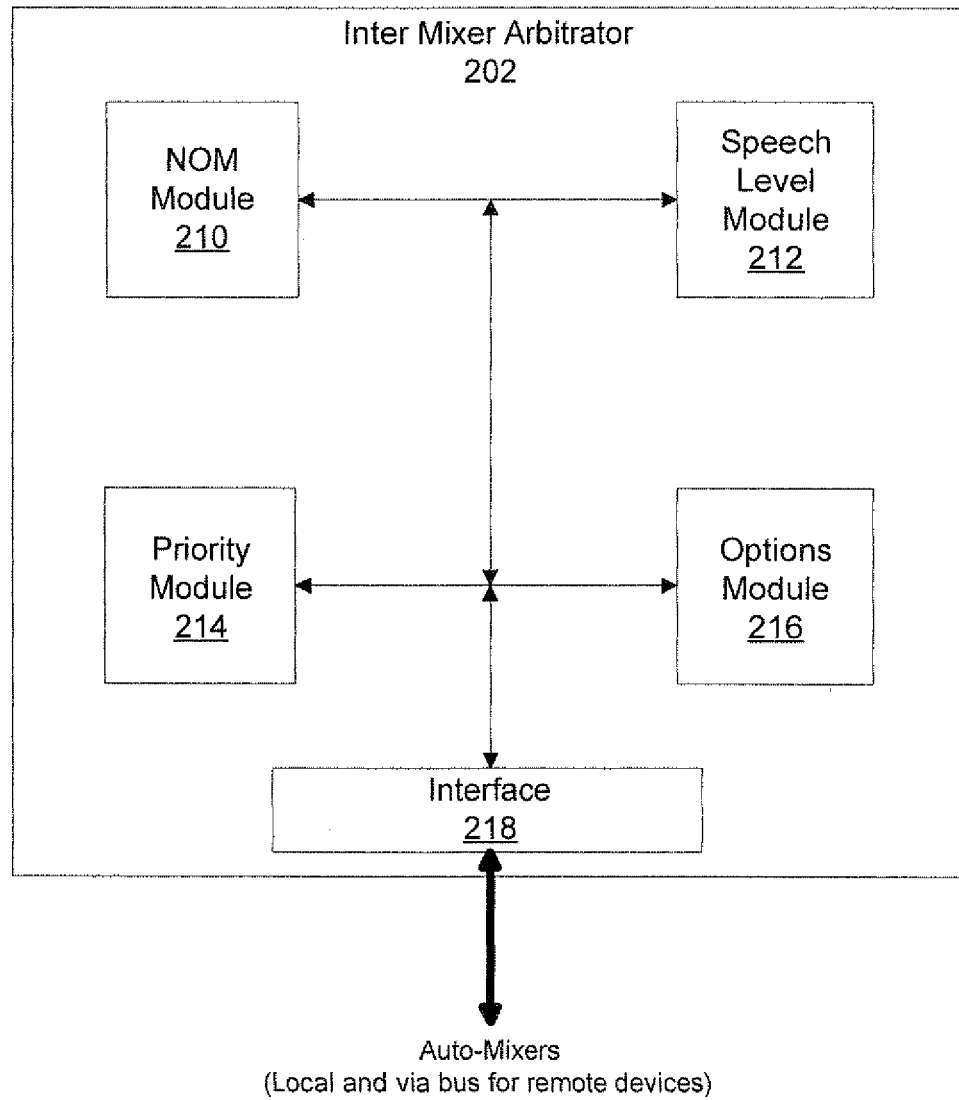
FIG. 2B is an exemplary block diagram of an inter-mixer arbitrator.

In FIG. 2B, an exemplary block diagram of the IMA 202 is shown. Within the IMA 202, a NOM module 210, a speech level module 212, a priority module 214, an options module 216, and an interface 218 are shown. The NOM module 210 maintains various NOM counts, such as a requested, current and total NOM counts, each of which will be described in further detail below. The speech level module 212 provides for analysis, selection, and arbitration of signals relating to microphones corresponding to the auto-mixers 102-108. The priority module 214 enables the IMA 126 to determine and assign priorities to the microphones 134-148 and the auto-mixers 102-108 which, in turn, enable the selection of a primary and zero or more secondary microphones. The options module 216 arbitrates and communicates with the option control logic module 204 in determining various options for the microphones 134-148. Data is communicated to both local auto-mixers 102 and 104 (FIG. 1) and remote auto-mixers 106 and 108 (FIG. 2) via interface 218 communicating with the state machines 206 (FIG. 2A) within each of the auto-mixers 102-108.

Figure 3A:
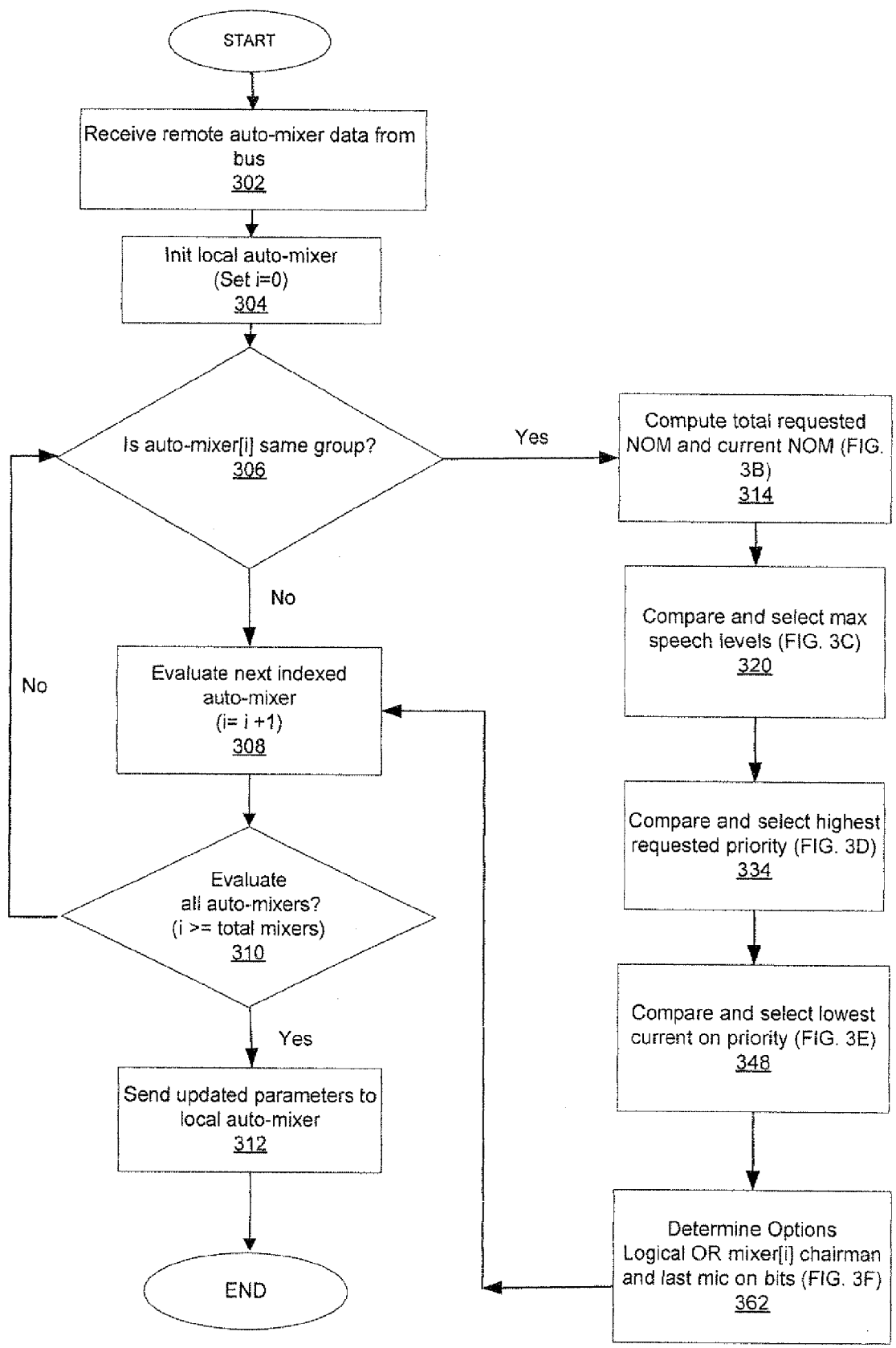
FIG. 3A is an exemplary flow chart illustrating an IMA logic loop.

Referring now to FIG. 3A, an exemplary flow diagram illustrating arbitration in an IMA is shown. For each audio processing frame, the IMA 126 (FIG. 1) will generate a packet of parameter data for each local auto-mixer 102 and 104 (FIG. 1). Parameter data may include information related to maximum long term signal levels, maximum short term signal levels, whether a chairman microphone is active, last mic on active, total request NOM, total current NOM, microphone priority, or auto-mixer group. This list of data is not intended to be comprehensive nor complete as alternative embodiments may include other data or parameters envisioned by one of ordinary skill in the art.

In an exemplary embodiment of the present invention, to generate the parameters for the local auto-mixers 102 and 104, the IMA 126 processes data from local and remote auto-mixers 102-108. This process of gathering inputs from the local and remote auto-mixers 102-108 enables the IMA 126, in this example, to include input and parameter data from other devices and all other auto-mixers in the same device (excluding the device to which the parameters are sent). Essentially, this enables multiple auto-mixer devices and systems with the ability to act as a single auto-mixer device or system.

Continuing the above exemplary embodiment and referring to FIG. 3A, the IMA 126 cycles through the data provided by the auto-mixers 102-108, in order of an assigned auto-mixer number. Initially, the IMA 126 collects data packets from the auto-mixers 102-108 over the bus 132 (FIG. 1) in step 302. Alternatively, a communications bus other than the bus 132 may also be used (i.e. serial/parallel bus).

In one embodiment, the IMA 126 arbitrates signals for each of the local auto-mixers 102 and 104 in order of priority. Signal and control data may be gathered in order of priority. By assigning priority to the auto-mixers 102-108, the IMA 126 assigns priority for processing data signals. However, there may be occasions when a conflict may exist between multiple auto-mixers with similar priorities.

Using an index value, i, the IMA 126 evaluates all data packets assigned to the same group/index value. The methods presented herein often use index values such as i in order to index and track particular data packets being processed by the IMAs 126 and 128. The indices assist the IMAs 126 and 128 to determine options and modes (i.e., chairman mic, last mic on, etc.) for the auto-mixers 102-108 and assigned microphones 134-148. In step 304, the IMA 126 initializes the local auto-mixers 102 and 104 within the local auto-mixer system. Next, a bus auto-mixer group identification (ID) of the auto-mixer in question is compared to the group ID of the priority local auto-mixer, for example, auto-mixer 102. If the group ID number of the auto-mixer sending data to the IMA 126 does not match the ID number of the auto-mixer 102 which is currently communicating with the IMA 126, then data from the non-matching auto-mixer is ignored in step 306. However, if the group IDs match, the parameters for NOM, speech levels, priority, "chairman mic," and "last mic on" are updated as appropriate. In alternative embodiments, other parameters may be updated as well. The method in which these parameters are updated is described in further detail below.

Referring back to step 306, once a particular auto-mixer is determined to belong to the same group (e.g., have the same group ID) as the local auto-mixer 102, the IMA 126 will accept signal input from the particular auto-mixer. For example, where the local auto-mixer 102 is the priority auto-mixer under arbitration, if the local auto-mixer 104 is determined to belong to the same group as the auto-mixer 102, then the IMA 126 will accept signal inputs from the auto-mixer 104. Likewise, if either or both of the auto-mixers 106 and 108 belong to the same group as the auto-mixer 102, where the auto-mixers 106 and/or 108 share the same ID code, then the IMA 202 (or the IMA 126 per FIG. 1) will accept signal input from the remote auto-mixers 106 and 108.

The IMA 202 will process each auto-mixer data according to the index value i assigned, as shown in steps 308 and 310, until the requisite number of auto-mixers and their respective data inputs have been processed. For example, the IMA 202 may be receiving data packets from devices assigned to the same group as the auto-mixer 102. If the auto-mixer 102 is part of Group 1, the auto-mixer 106 is part of Group 7, and the auto-mixer 108 is part of Group 1, then the IMA 126 will ignore all data packets being sent from the auto-mixer 106, but will receive data from the remote auto-mixer 108, which has the same group ID as the local auto-mixer 102. Data packets received from the auto-mixer 108, will be evaluated, according to FIG. 3A, based upon index value i assigned to the packet as well as the type of information or parameters the data packet contains, such as NOM count, maximum speech levels, etc. as shown in step 308. If the index value i exceeds the total number of auto-mixers in the system which are sending data to the IMA 126, then the IMA 202 will no longer continue to evaluate packet data.

By repeating the above process, all data packets are processed by the IMA 202. Updated parameters are determined for all auto-mixers sharing the same auto-mixer ID as the local auto-mixer 102. In step 312, these updated parameters are sent to the local auto-mixer 102.

Returning to step 306, if an auto-mixer has the same group ID as the subject auto-mixer (i.e. the local auto-mixer 102), then multiple parameters within data packets are processed and evaluated. These parameters include NOM parameters in step 314, maximum speech levels in step 330, highest requested priority in step 334, lowest on priority in step 348, and chairman mic or last mic on control options in step 362. Elaboration on each of these steps is discussed further below. Although steps 314-362 are illustrated in FIG. 3A, alternatively, not all of these steps may be utilized, other steps may be used, and the order of the steps may be performed differently in alternative embodiments.

Figure 3B:
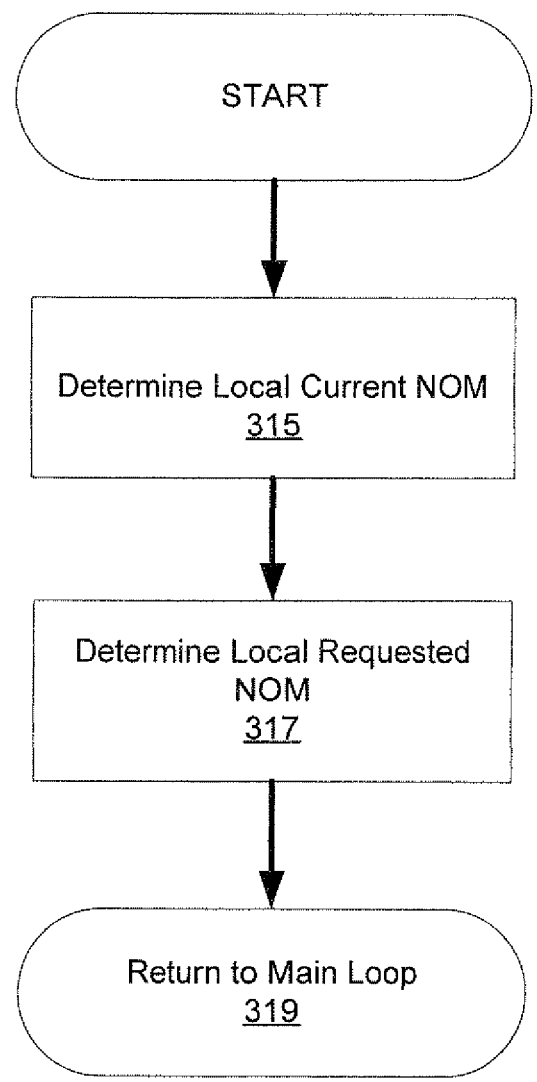
FIG. 3B is an exemplary flow chart illustrating how an IMA computes requested and current number of open microphone (NOM)

FIG. 3B illustrates the operation of the IMA 126 (FIG. 1) with respect to maintaining a NOM count (step 314 of FIG. 3A). A running total NOM count is maintained by the IMA 126. The NOM counts are provided as parameters to the local auto-mixers 102-104 (FIG. 1). The total NOM count is a sum of the NOM counts for all auto-mixers in the same group as the local auto-mixer (i.e. 102). There are two types of NOM counts. Current NOM (C_NOM) is the number of open microphones that are actually open. In step 315, the IMA 126 determines a total current NOM count by adding a local current NOM count to a remote current NOM count. This provides a total count of the number of microphones that are gated open.

In step 317, the IMA 126 sums up the number of local and remotely requested NOM. The requested NOM (R_NUM) is a number of microphones that are not yet open, but have enough speech energy that a state machine indicates the microphones that are eligible to be gated open. If there are no restrictions (e.g., NOM count or chairman mode), the microphones will gate open in a subsequent frame. Otherwise, the microphones wait to gate open. Eligible microphones may be prevented from opening by a user-defined limit in the system NOM. In step 319, the IMA 126 returns to continue evaluating a subject data packet for maximum speech levels, according to the embodiment of FIG. 3A.

In an exemplary embodiment, there are two speech levels used by the state machine 206 (FIG. 2A) to determine whether a microphone is eligible to be gated open. The speech levels are a long term speech level and a short term speech level. The state machine 206 uses the maximum long term and short term speech levels in each frame to determine whether a given microphone should be opened. The IMA 126 tracks the maximum long term and short term speech levels by keeping a running maximum of these levels for all auto-mixers in the auto-mixer group. Additionally, the IMA 126 records individual measurements for both long term and short speech levels for each microphone assigned to the auto-mixers 102-108.

Under a given set of parameters, particular microphones may be gated open or closed, depending upon the long and short-term speech levels. For example, a high long-term speech level may indicate a microphone, corresponding to a local auto-mixer 102 (FIG. 1) that may be experiencing a significant amount of noise activity. By contrast, another microphone, for example, corresponding to auto-mixer 108, may have a relatively low long-term speech level, which has been monitored by the IMA 126. If so, then the IMA 126 may gate closed the microphone as it is experiencing relatively little long-term noise activity. In a similar manner, the IMA 126 also monitors the short-term speech levels of microphones assigned to the auto-mixers 102-108.

Figure 3C:
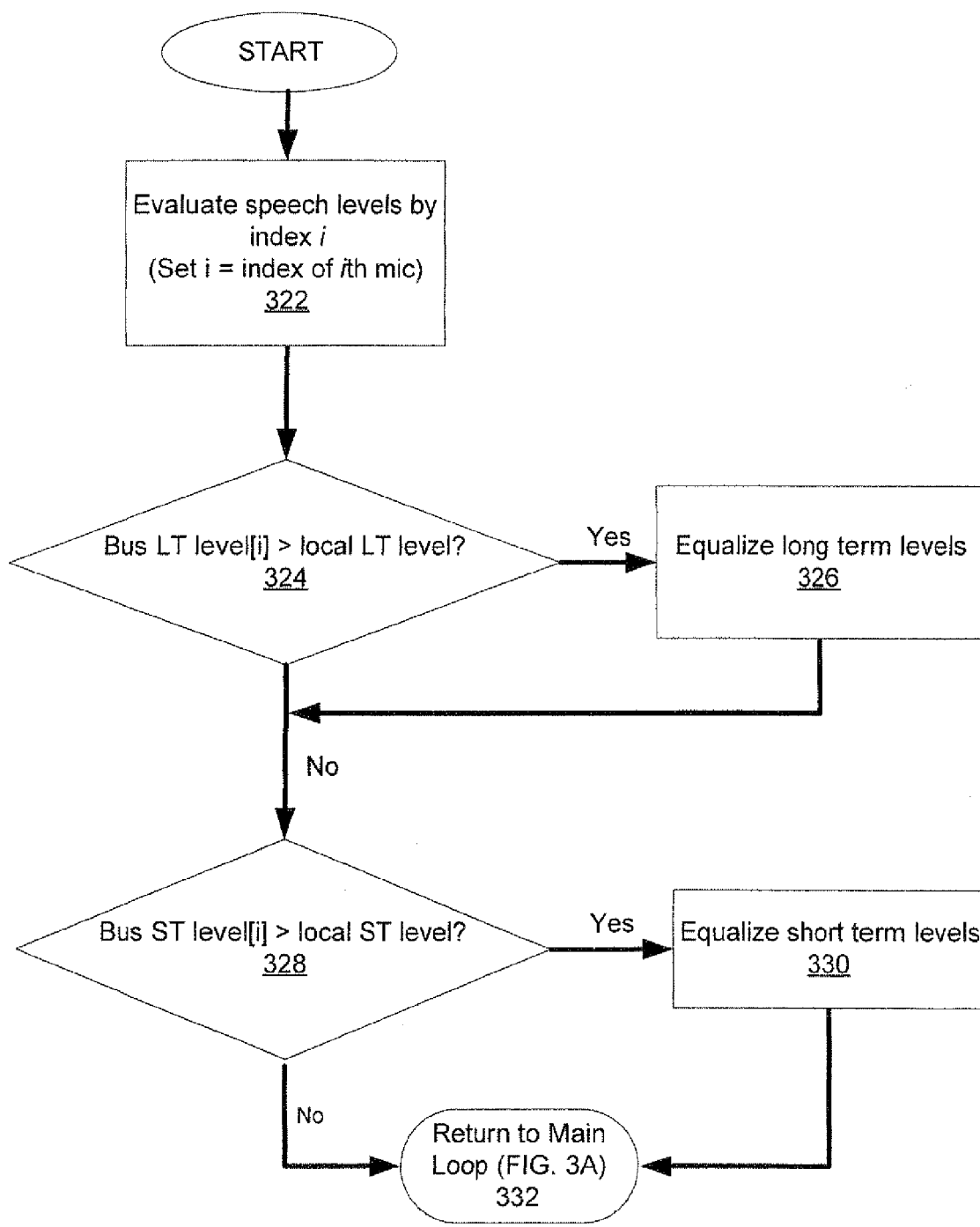
FIG. 3C is an exemplary flow chart illustrating how an IMA compares and selects a maximum speech level.

As shown in FIG. 3C, an exemplary flow chart of the maximum speech levels in step 320 (FIG. 3A) is provided. Initially, the IMA 126 (FIG. 1) sets the index value i to an index value of an i.sup.th microphone in step 322. Next, the IMA 126 determines whether a bus-communicated long term speech level (from a remote auto-mixer) is greater than the local long term speech level in step 324 (from a local auto-mixer). If the bus long term speech level of remote auto-mixers is greater than the local long term speech level, then the IMA 126 sets the local long term speech level to be equivalent to the bus long terms speech level in step 326. However, if the bus-communicated long term speech level is not greater than the local long term speech level or, in the case that the IMA 126 sets both local and bus long term speech levels to be equivalent, then IMA 126 evaluates short term speech levels in step 328.

Thus, in step 328, the IMA 126 determines whether a bus-communicated short term speech level (i.e., remote auto-mixers 106-108) is greater than local short term speech levels. If the bus-communicated short term speech level is greater than the local short term speech level, then the IMA 126 sets the local short term speech level to be equal to the bus-communicated short-term speech level in step 330. However, if the bus-communicated short-term speech level is not greater than the local short term speech level or if the local short term speech level is equal to the bus-communicated short-term speech level, then the IMA 126 will return to the primary packet data loop of FIG. 3A. Next, the IMA 126 evaluates user-specified priorities among both local and bus/remote auto-mixers (step 334 of FIG. 3A).

Figure 3D:
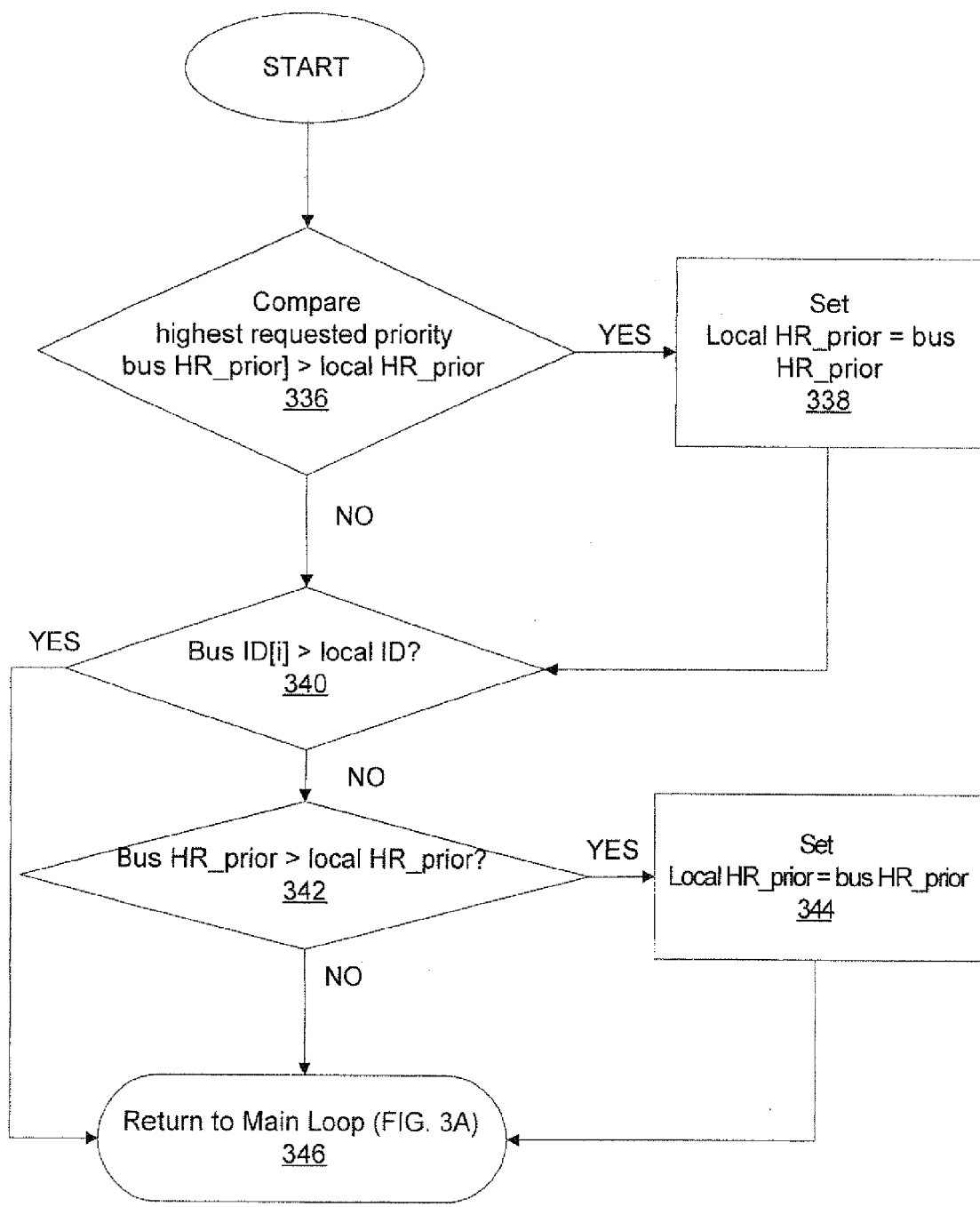
FIG. 3D is an exemplary flow chart illustrating how an IMA compares and selects a highest requested priority.

The IMA 126 tracks the highest priority of any microphone which requests to be opened, but is not currently open (i.e., RNOM). Thus, if any microphones are requesting to be gated open in a given frame, the highest requested priority microphone will be gated open first. The process to determine the highest priority is illustrated in the exemplary flow diagram of FIG. 3D. Initially, the IMA 126 (FIG. 1) compares highest requested priorities of microphones which are not gated open in order to determine an order for gating open these microphones. To handle conflicts when multiple auto-mixers have channels with the same priority waiting to be opened, the IMA 126 also keeps track of the highest requested priority microphone in any auto-mixer with a lower auto-mixer number than the local auto-mixer. Thus, the local auto-mixer 102 or 104 may gate open a microphone if an assigned microphone has a higher priority than any microphone assigned to another auto-mixer, and a priority greater than or equal to any auto-mixer in the auto-mixer group.

In step 336, the IMA 126 compares a highest requested priority of microphones assigned to remote auto-mixers 106 and 108 (FIG. 1). If the remote microphones have a higher requested priority than microphones assigned to the local auto-mixers 102 and 104 (i.e., bus highest requested priority is greater than the local highest requested priority), then the highest requested priority for the microphones assigned to the local auto-mixers 102 and 104 is set equal in step 338. After determining the highest requested priority, the IMA 126 compares the group ID of the bus-communicating remote auto-mixers 106 and 108 to the group ID of the local auto-mixers 102 and 104. That is, in step 340, the IMA 126 determines whether the bus ID (assigned to the remote auto-mixers 106 and 108 providing the data packets from the remote microphones) is greater than the local ID. If so, then the IMA 126 returns to continue evaluating additional packet data according to the embodiment of FIG. 3A.

Steps 342 and 344 handle conflicts when multiple auto-mixers have channels with the same priority waiting to be opened. In step 342, the IMA 126 compares a bus-communicated highest requested priority to a local highest requested priority (i.e., is bus highest requested priority greater than the local highest requested priority?). If the bus-communicated highest requested priority is greater than the local highest requested priority of a microphone, then in step 344 the IMA 126 sets the local highest requested priority to be equal to the bus-communicated highest requested priority. The IMA 126 tracks the highest requested priority microphone in any auto-mixer with a lower auto-mixer number than the local auto-mixer. Thus, the local auto-mixer may open a microphone with a higher priority than any auto-mixer with a lower auto-mixer number and a priority greater than or equal to any auto-mixer in the auto-mixer group.

Figure 3E:
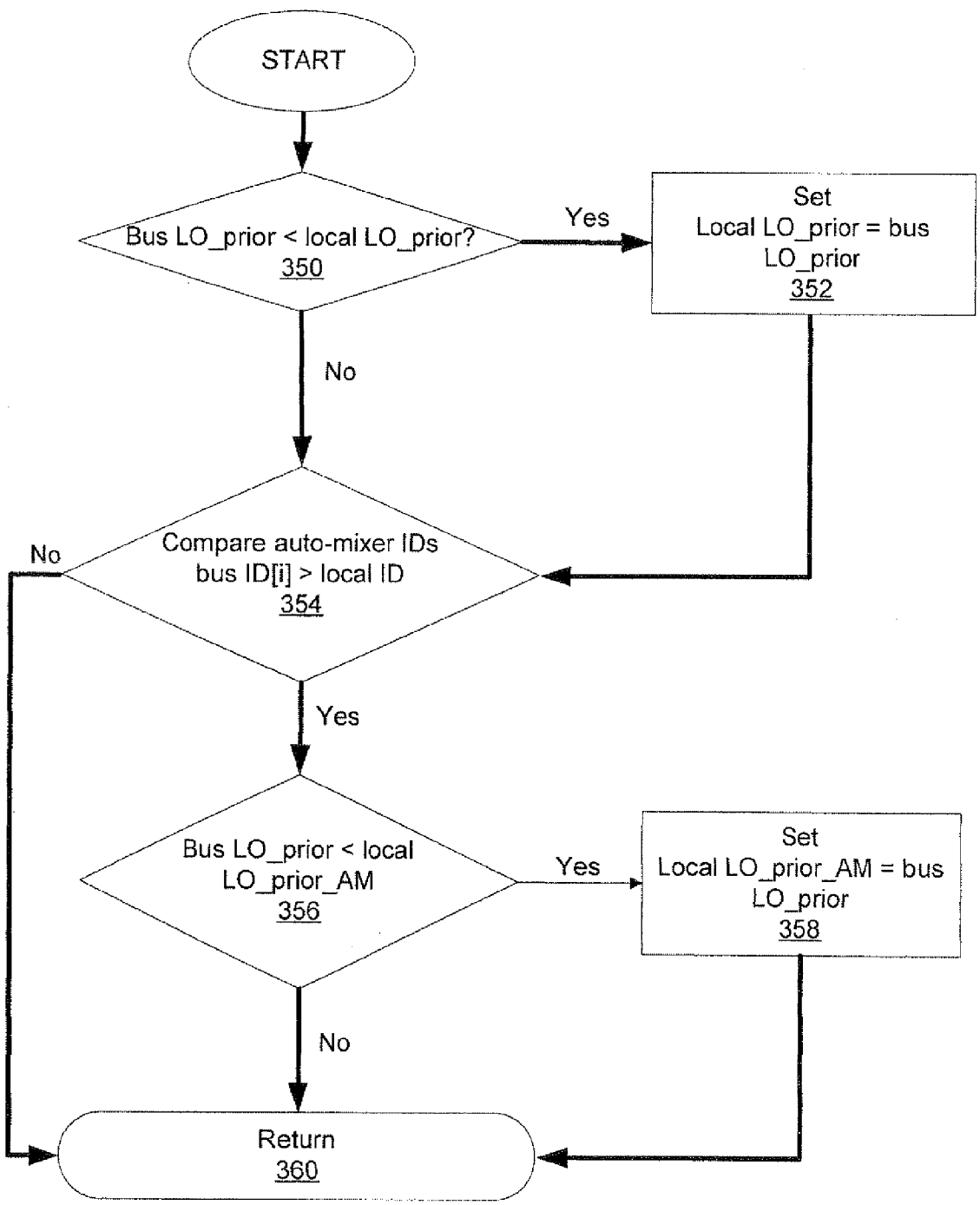
FIG. 3E is an exemplary flow chart illustrating how an IMA compares and selects a lowest current on priority.

Similarly, the IMA 126 tracks the lowest priority of any microphone that is currently open. As shown in the exemplary flow chart of FIG. 3E, if the NOM limit has been reached, the lowest priority microphone channel will be closed if there are higher priority channels waiting to open, as shown in steps 350 and 352. In step 350, the IMA 126 compares a bus-communicated lowest priority with a local lowest priority. If the local lowest priority is greater than the bus-communicated lowest priority, then the IMA 126 sets the local lowest priority to be equal to the bus-communicated lowest priority in step 352. If the local lowest priority is not greater than the bus-communicated lowest priority, then the IMA 126 compares the group IDs of the remote auto-mixers (i.e., bus ID[i]) with the group ID of the local auto-mixers 102 and 104. The IMA 126 also keeps track of the lowest priority open microphone in any auto-mixer with a higher auto-mixer number that the local auto-mixer to handle the case where multiple microphone channels with the same low priority are open in step 356. If a bus-communicated (i.e., remote auto-mixers) lowest priority of an open microphone is less than the local lowest priority of an open microphone assigned to a local auto-mixer, then the local lowest priority of the open microphone assigned to the local auto-mixer (i.e., 102 and 104) is set equal to the bus-communicated lowest priority of an open microphone assigned to the remote auto-mixers (i.e. 104 and 108) in step 358.

Figure 3F:
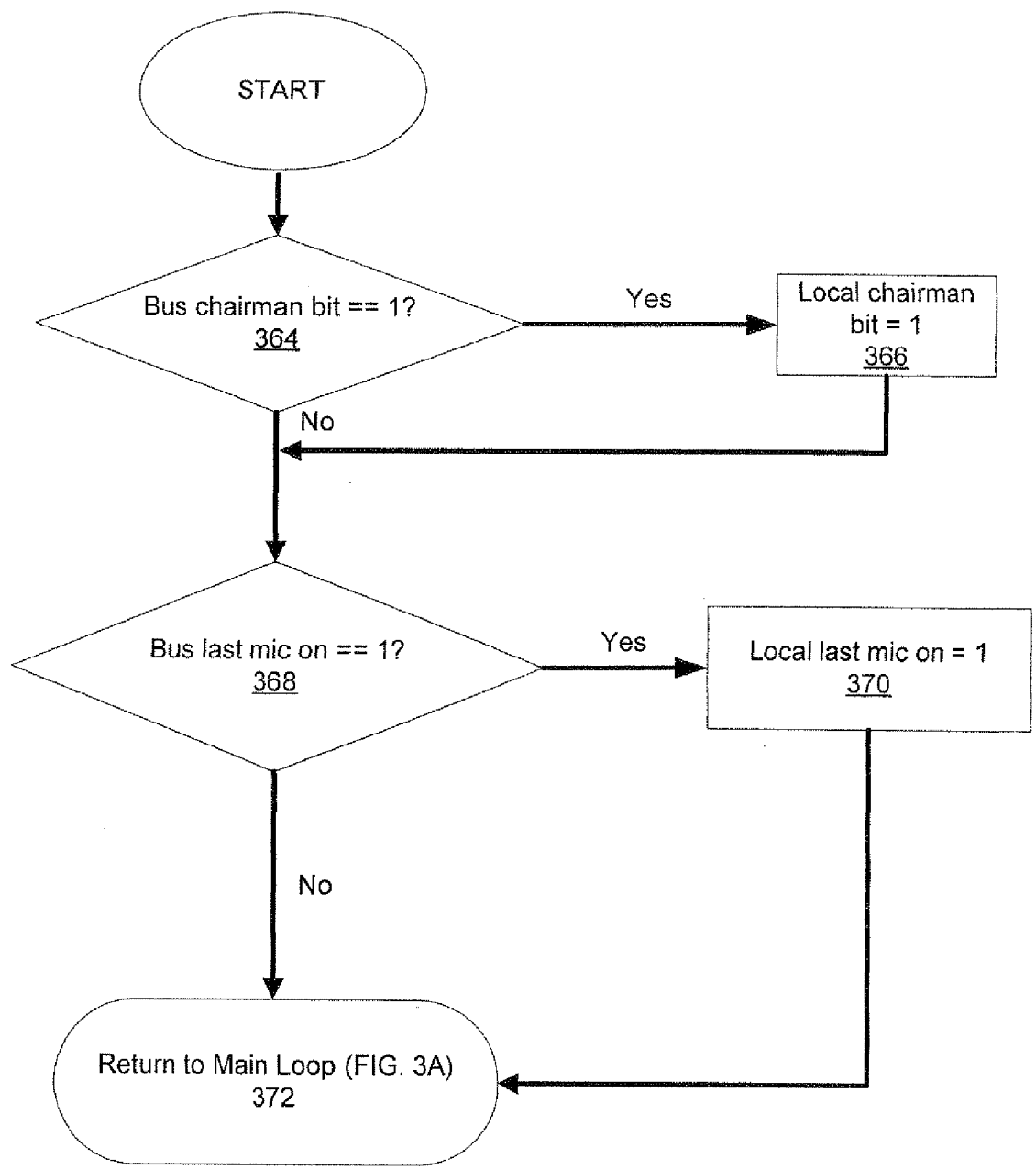
FIG. 3F is an exemplary flow chart illustrating how an IMA processes chairman bits and last microphone on bits.

An exemplary flow chart of step 362 of FIG. 3A is shown in FIG. 3F. If any of the auto-mixers 102-108 have activated a chairman microphone in step 364, the chairman microphone parameter passed to the local auto-mixer is set as true in step 366. The IMA 126 (FIG. 1) determines whether a chairman microphone is assigned by evaluating data packets. If a bus-communicated data packet indicates that a microphone assigned to a remote auto-mixer is to be the chairman microphone, then the IMA 126 will set the chairman microphone parameter for a local microphone to be equal to one, so as to not override the chairman microphone in step 366. This is effectively a logical OR of the chairman microphone status of all auto-mixers in the same group as the local auto-mixer.

However, if the bus-communicated data packet does not indicate that a microphone assigned to a remote auto-mixer is to be assigned as a chairman microphone in step 364, then the IMA 126 determines whether a remote or local microphone is to be assigned an option of last microphone on in step 368. If the bus-communicated data packet indicates that a microphone assigned to a remote auto-mixer is to be assigned as the last microphone on (i.e. bus last mic is on), then the bit for determining whether a local microphone is to be the last microphone on is set to be equal to one or the parameter of that of the remote microphone in step 370. Similarly, the last microphone on parameter is a logical OR of the "last microphone on" status of all auto-mixers in the same group as the local auto-mixer.

Figure 4A:
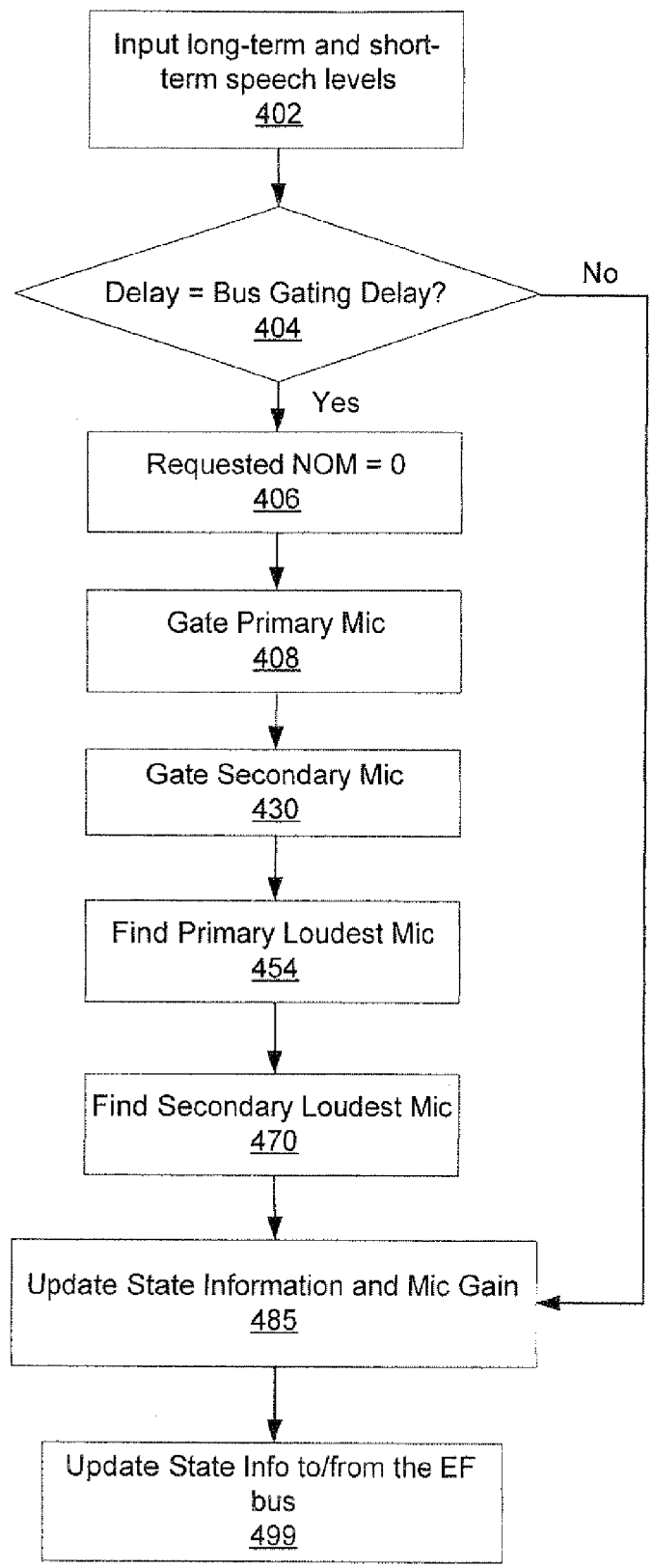
FIG. 4A is an exemplary flow chart illustrating a state machine logic loop.

Referring now to FIG. 4A, an exemplary flow chart of the process for determining a primary and one or more secondary microphones is shown. The state machine 206 (FIG. 2A) determines which microphones (and channels) should be gated open or remain gated open based on a histogram of signal levels. Each auto-mixer contains the state machine 206 which tracks the speech signal level of each microphone. Recording the speech signal levels, the state machine 206 maintains a histogram of data which, by averaging the histogram readings for all microphones, enables the state machine 206 and, in turn, each auto-mixer to determine a primary and one or more secondary microphones. The state machine 206 represents data collected from the request made to gate open particular microphones in a histogram. The histogram is a frequency distribution of the number of times a particular microphone has requested to be opened (i.e., frequency versus time). A histogram is created for each microphone, which the state machine 206 uses to determine a primary and/or a secondary microphone. For example, hist[i_o] is the histogram of the oldest microphone which is decremented for each frame. Hist[i_n] is the histogram of the current loudest microphone. Hist[i_n] is used to gate a microphone "open" if the number of requests in Hist[i-n] exceed a certain level, thereby signaling the state machine 206 that a particular microphone has requested to be opened.

Two types of levels are used: long term speech levels (for gating the primary microphone), and short term speech levels (for gating the secondary microphones). The speech levels are based on speech or noise signals gathered by each microphone and communicated to a corresponding auto-mixer and then to an IMA (e.g., IMA 126). In step 402, both long-term and short-term speech levels are input into the state machine 206 for determining which channels to gate open or closed.

Next, in step 404, the state machine 206 compares a local delay to a bus-gating delay. The locally-imposed delay by the state machine 206 removes any bias from the speech/noise signals of local microphones. In general, the bias affects the gating of local microphones compared to those of microphones on other devices. If the local and bus-gating delays are equal, then the state machine 206 sets the requested NOM count to 0 in step 406. Then, the state machine 206 gates a primary and secondary microphone based on histograms of long term and short term speech levels in steps 408 and 430. After gating a secondary microphone, the state machine 206 finds a primary loudest microphone in step 454. Next, the state machine 206 finds a secondary loudest microphone in step 470. After determining a secondary loudest microphone, the state machine 206 updates state information and microphone gain data, which is communicated to a corresponding local IMA. Finally, the state machine 206 updates state information to a remote IMA and remote auto-mixers over a bus 132 (FIG. 1). FIGS. 4B-4F, as further described below, will detail the internal processes of the state machine 206 within an exemplary auto-mixer. The histograms are then updated with the current signal level information, and the state information is updated and sent back out on the bus to other auto-mixers in step 499.

Figure 4B:
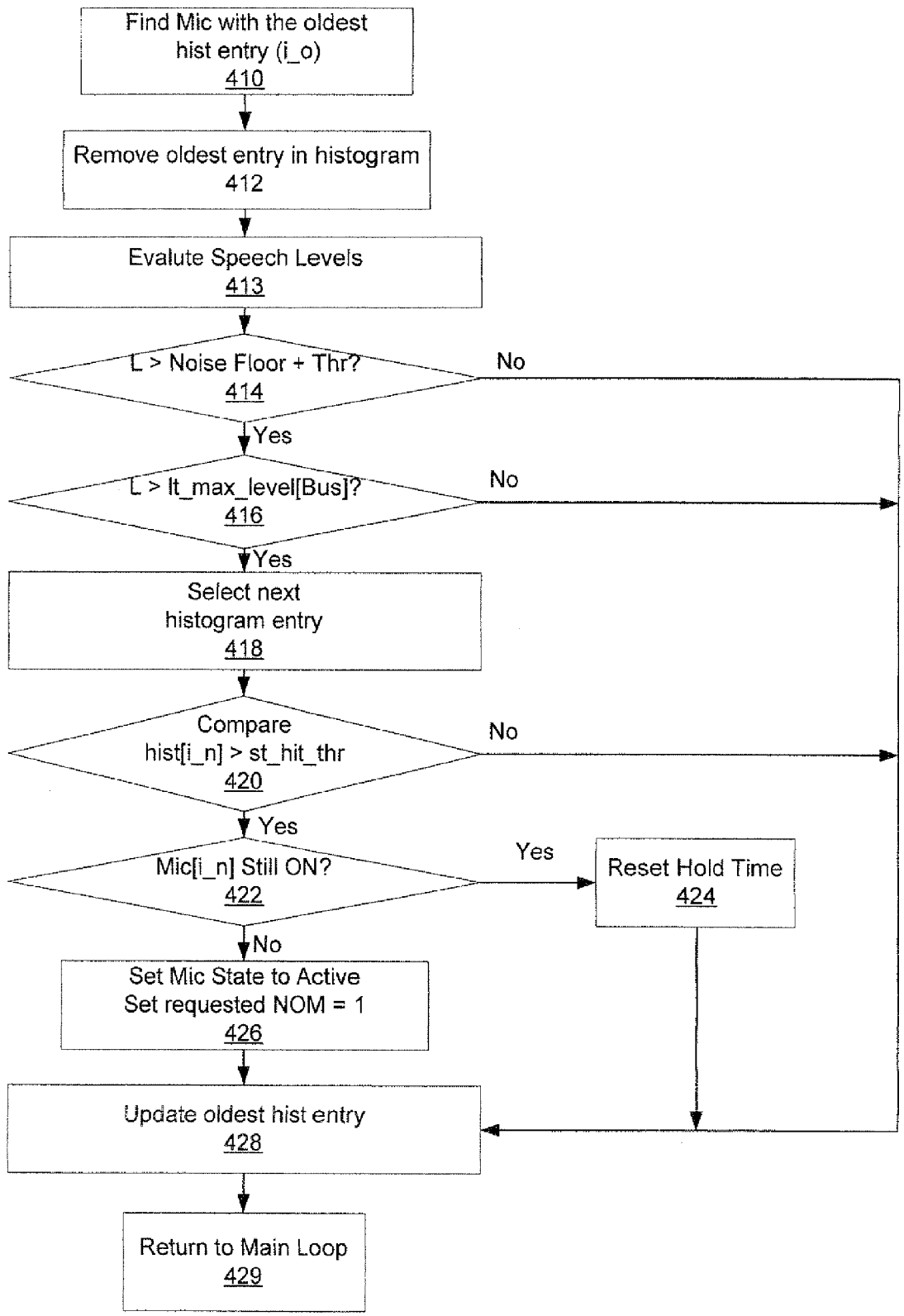
FIG. 4B is an exemplary flow chart illustrating how a state machine gates a primary microphone.

FIG. 4B is an exemplary flow chart of details of the state machine 206 (FIG. 2) process for gating a primary microphone of step 408 of FIG. 4A. A primary microphone is a microphone with the largest long-term speech signal energy level. The microphone with the largest long term level is recorded and characterized using a histogram, as described above. If a given microphone channel has enough entries in a histogram, a microphone is eligible to gate as a primary microphone. Gating a primary microphone comprises two steps: updating a histogram with the latest frame of data and determining if any local microphones have enough entries in the histogram to be activated.

In step 410, the state machine 206 determines the microphone with the oldest histogram entry. To update the histogram, the oldest entry in the histogram is removed in step 412. The oldest entry in the histogram is then checked to see which microphone channel is the loudest. In step 413, if a microphone was a local microphone, the histogram count for that microphone is decremented. Then, the level of the local microphone with the highest long term level is compared with the adaptive noise floor in step 414. Next the level of the local microphone is compared with the loudest long term level from the bus in step 416 if the local microphone has a level above the adaptive noise floor. If the loudest local microphone has a long term level higher than either the local microphone level or the adaptive noise floor, then the histogram count is incremented and the associated microphone index is entered into the newest entry for the histogram in step 418. Next, the newest histogram entry is compared to the short term histogram noise threshold in step 420. If none of the local microphones have higher long term levels than the adaptive noise floor or the loudest signal on the bus, then no histogram counts are updated and the newest entry in the histogram indicates that no local microphones were loudest in step 428. The state machine 206 evaluates the gated state of a local microphone in step 422. Alternatively, if a local microphone is on or active (i.e., gated open) then the local microphone's hold time is reset in step 424. If the local microphone is not on or active, then the state machine 206 sets the local microphone to an active state by gating the microphone open and setting the requested NOM count equal to one in step 426.

Figure 4C:
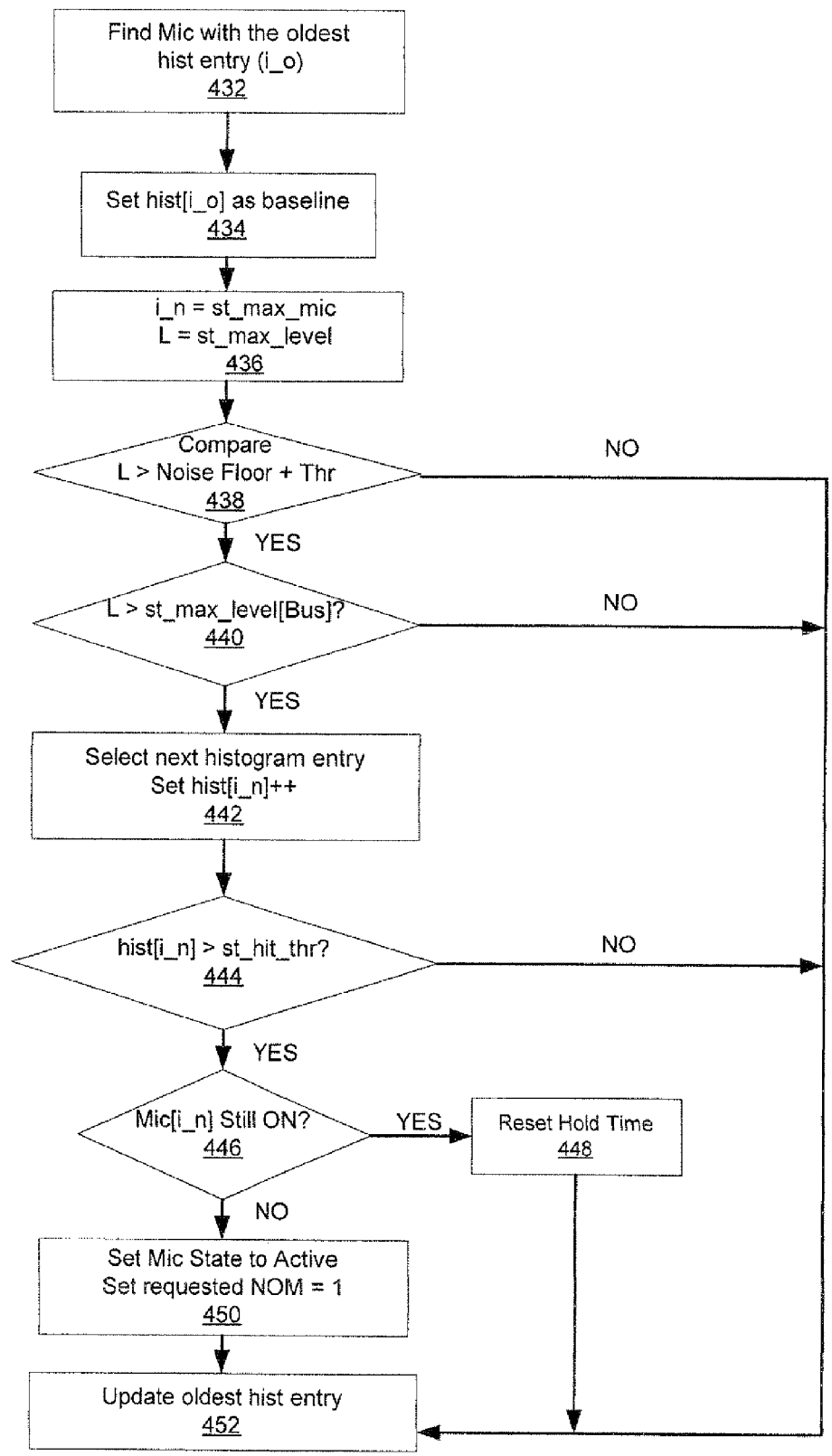
FIG. 4C is an exemplary flow chart illustrating how a state machine gates a secondary microphone.

The process for gating a secondary microphone is similar to the process described above for the primary microphone, except that the state machine 206 uses a short term level for comparison with other levels and uses a longer histogram as described in FIG. 4C. Referring now to FIG. 4C, the state machine 206 (FIG. 2) evaluates a histogram for a secondary microphone in a similar manner as that for a primary microphone. The state machine 206 finds the microphone with the oldest histogram entry in step 432. Next, the state machine 206 sets this histogram entry as a baseline entry in step 434. In step 436, the oldest histogram short term speech level is set to be equal to the maximum short term speech level for a microphone. Also, the threshold speech level is set to be equal to the maximum short term speech level in step 436. In step 438, the speech level is compared to the noise floor and noise threshold. If the speech level is not greater than the noise floor and noise threshold, then the state machine 206 updates the oldest histogram entry in step 452. If the speech level is greater than the noise floor and noise threshold, then the state machine compares the speech level to the short term maximum level of any remote microphones whose data is communicated over the bus 132 (FIG. 1) in step 440. Again, if the speech level is not greater than the short term maximum speech level of the remote microphones and auto-mixers, then the oldest histogram entry is updated in step 452. If the speech level is greater than short term maximum speech level of the remote microphones and auto-mixers, then the state machine 206 sets the speech level of the oldest histogram entry as the baseline levels in step 442. The oldest histogram entry is compared to the short term noise threshold in step 444. The state machine 206 evaluates the active state of the microphone associated with the oldest histogram entry in step 446 if the oldest histogram entry is greater than the short term level noise threshold. If the microphone is still on, then the hold time is rest in step 448. If the microphone is not on, then the state machine 206 will gate the microphone on and into an active state, setting the requested NOM count equal to one in step 450.

Figure 4D:
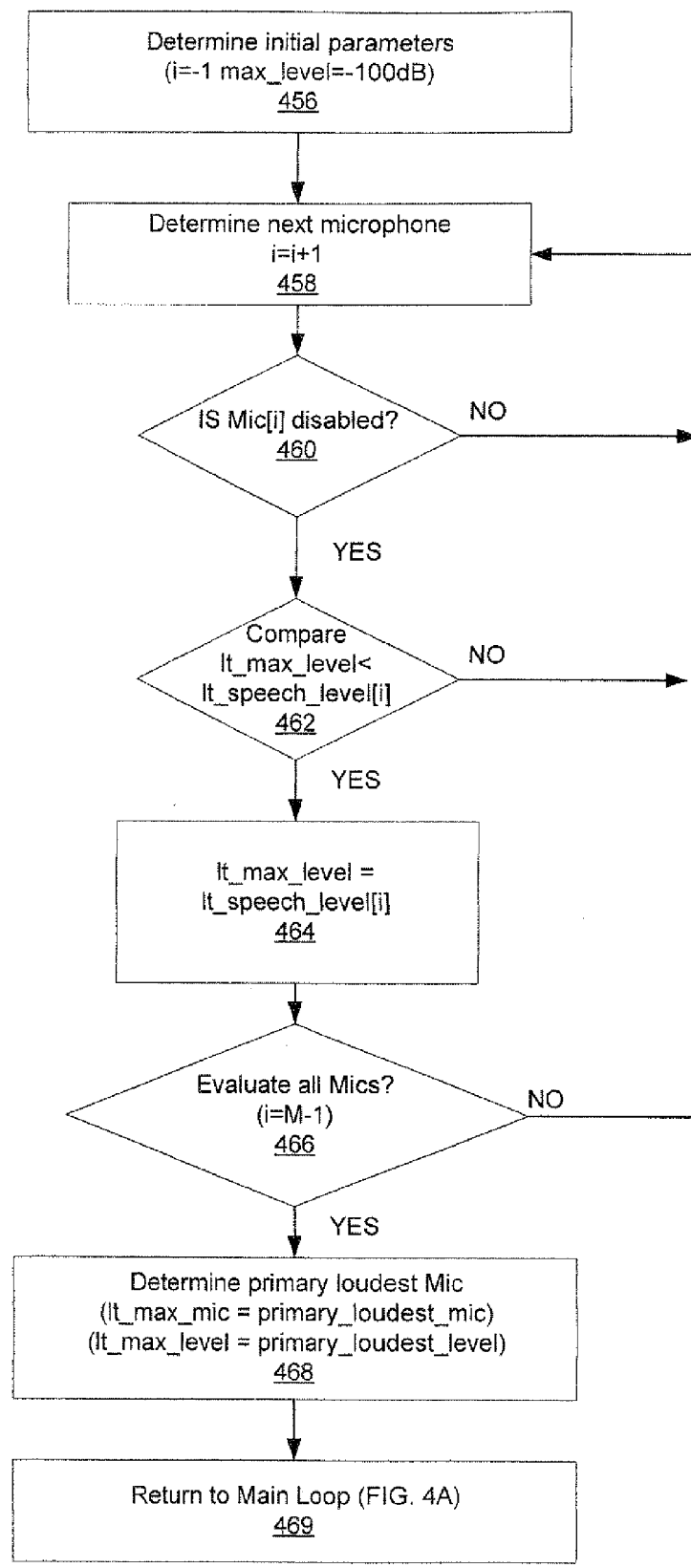
FIG. 4D is an exemplary flow chart illustrating how a state machine finds a primary loudest microphone.

FIG. 4D illustrates the process for finding the loudest primary microphone. These values (the index and level) are sent to other auto-mixers over the bus, and are entered into the histogram during the next frame. The state machine 206 (FIG. 2) sets the index value to the lowest value, as indicated by a "−1" and the maximum speech level is set to −100 dB, which is intended to represent a lowest possible noise level in step 456. One of ordinary skill in the art would consider −100 dB to be below a reasonable lowest possible noise level or floor that would be picked up by a microphone. The state machine 206 (FIG. 2) then incrementally processes each data packet based on the next sequential index value in step 458. Next, the state machine 206 determines whether a microphone under evaluation is disabled in step 460. Disabled microphones in an auto-mixer are left out of this calculation so as to not affect the gating behavior of other microphones as shown by step 460. If the microphone is disabled, then the state machine 206 compares the long term maximum speech level with the long term speech level of the microphone under evaluation (referenced by index value i) in step 462. If the long term maximum speech level is less than the long term speech level of the microphone under evaluation then the state machine 206 sets the latter to be equal to the former in step 464. Subsequently, the state machine 206 determines whether all microphones that require evaluation have been evaluated by comparing the index value of the microphone under evaluation with the maximum number of microphones, M in step 466. The state machine 206 will repeat this process until all microphones have been evaluated. Finally, the state machine 206 determines a primary loudest microphone and a primary loudest level in step 468.

Figure 4E:
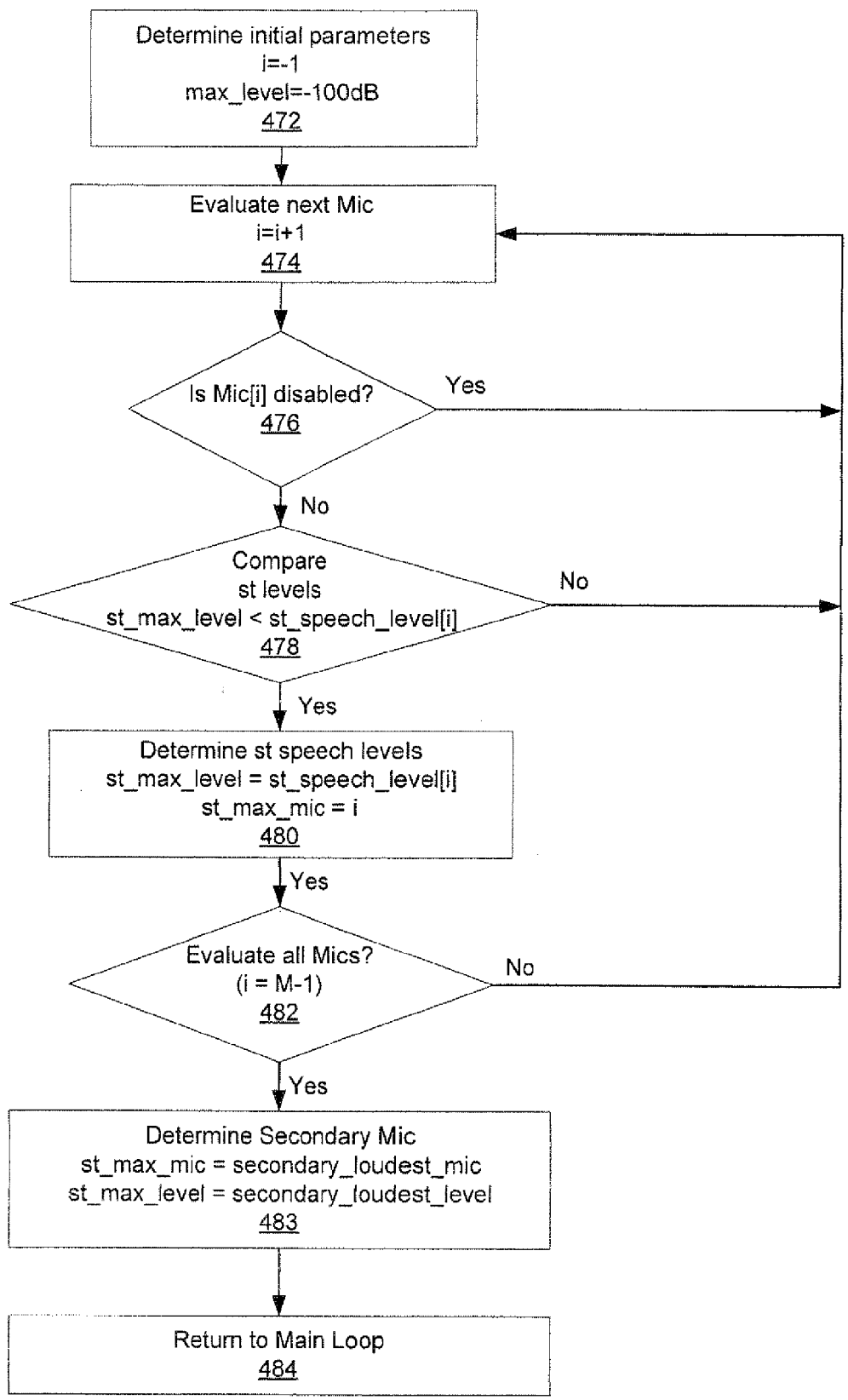
FIG. 4E is an exemplary flow chart illustrating how a state machine finds a secondary loudest microphone.

In FIG. 4E, a similar process is executed for finding a loudest secondary microphone. By contrast, the state machine 206 (FIG. 2) uses short-term speech levels instead of long-term speech levels to find the loudest secondary microphone. Again, the loop is executed for all relevant microphones, the total number of which is established as "M." By referencing the index value i of each microphone, the state machine 206 evaluates each microphone in step 474. The microphone with the loudest short-term level is not necessarily the same as the microphone with the loudest long-term level, thus requiring a similar process.

The state machine 206 determines whether the microphone under evaluation is disabled in step 476. If not disabled, the state machine compares the short term maximum with the current speech level in step 478. If the short term maximum speech level is less than the short term current speech level of the microphone under evaluation, then the state machine 206 sets these levels to be equal to each other in step 480. The process is repeated until all relevant microphones have been evaluated in step 482. After evaluating all microphones, M, the state machine 206 then determines a secondary loudest microphone, communicating data packets to all other microphones and auto-mixers, both local and remote, if necessary, in step 483.

Figure 4F:
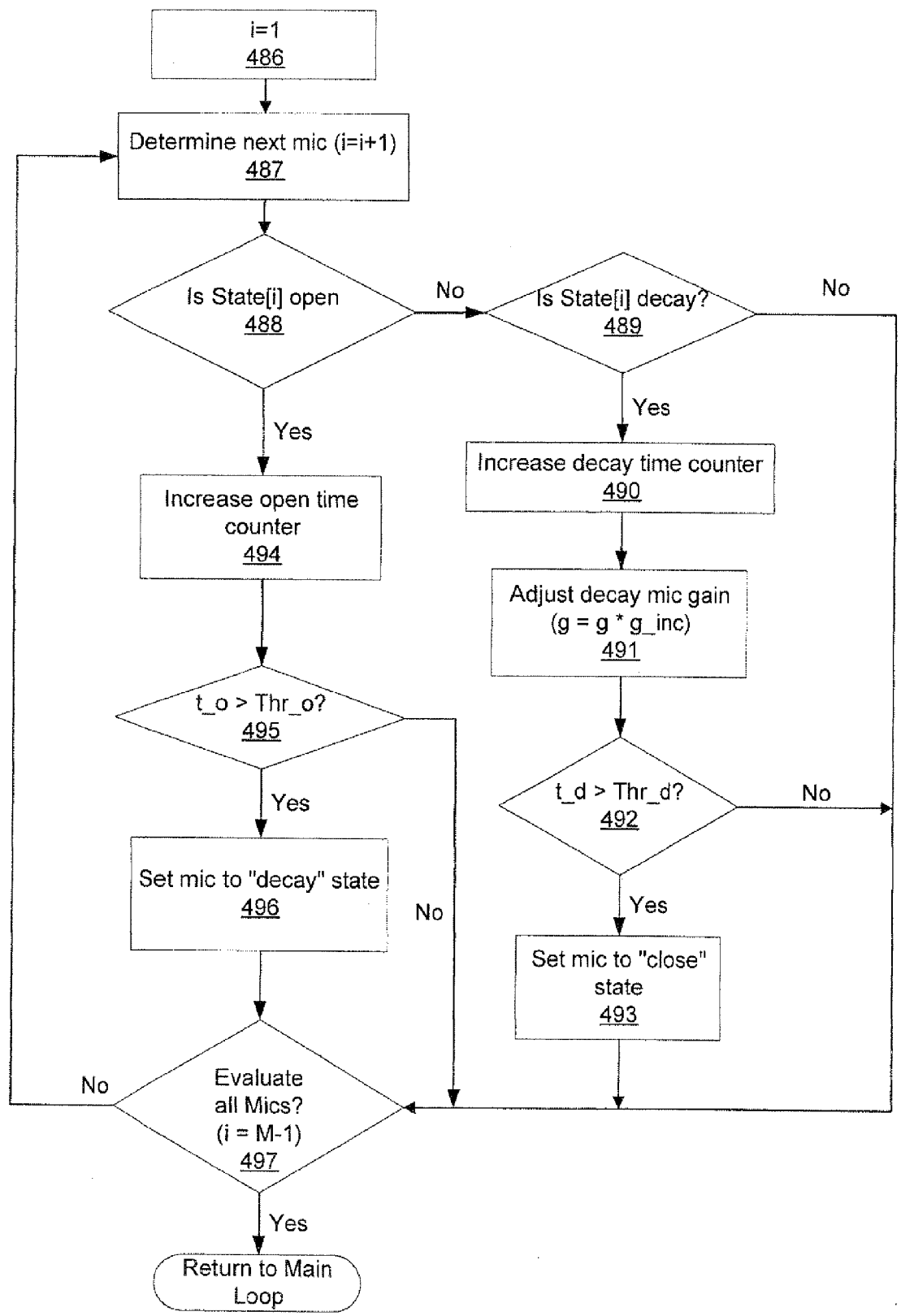
FIG. 4F is an exemplary flow chart illustrating how a state machine updates state information.

As illustrated in the exemplary flow chart of FIG. 4F, the state machine 206 (FIG. 2) updates the gating state information for each microphone in step 485 (FIG. 4A). In step 487, the state machine 206 determines which of the microphones 134-148 (FIG. 1) to evaluate, based upon an index value i. Each microphone in the system may be open (set to 0 dB attenuation), closed (set to the off attenuation), decaying (ramping down from 0 dB to the off attenuation), or opening (which ramps up quickly in one frame from the off attenuation to 0 dB). In step 488, the state machine 206 evaluates a state for the indexed microphone. If a microphone is open, then the state machine 206 increases the open time counter for the subject microphone in step 494. If the microphone is closed, then the state machine 206 evaluates the decay for the indexed microphone in step 489. If the indexed microphone state is decaying, then the state machine 206 increases a decay time for the indexed microphone's current state in step 490. If the indexed microphone is not in a decaying state, then the state machine 206 moves on to the next indexed microphone in step 497. After increasing the decay time for the indexed microphone, the state machine adjusts the decay of the microphone gain in step 491. The state machine 206 slowly decreases gain during a decay time and keeps track of current gain. Then, the state machine 206 compares the indexed microphone's decay time with a threshold decay time in step 492. If the indexed microphone decay is greater than the threshold decay time, then the state machine 206 gates closed the indexed microphone in step 493. If not, then the state machine 206 continues to the next indexed microphone.

Referring back to step 495, after opening the time open counter for the indexed microphone, the state machine 206 evaluates open time of the indexed microphone with a threshold open time period. If the open time period of the indexed microphone is less than the threshold open time period, then state machine 206 evaluates the next indexed microphone, as in step 497. However, if the open time period of the indexed microphone has exceeded the system threshold time period, then the state machine 206 sets the microphone state to decay in step 496. Each microphone is kept open until a hold time periods expire or until the hold time periods are reset due to additional microphone activity. The state machine 206 loops through this process for all microphones, M, in step 497. Generally, the hold time and decay time are configurable by the user, but may be set to 500 and 1000 ms, respectively, although one of ordinary skill in the art may implement varying time periods.

Figure 5A:
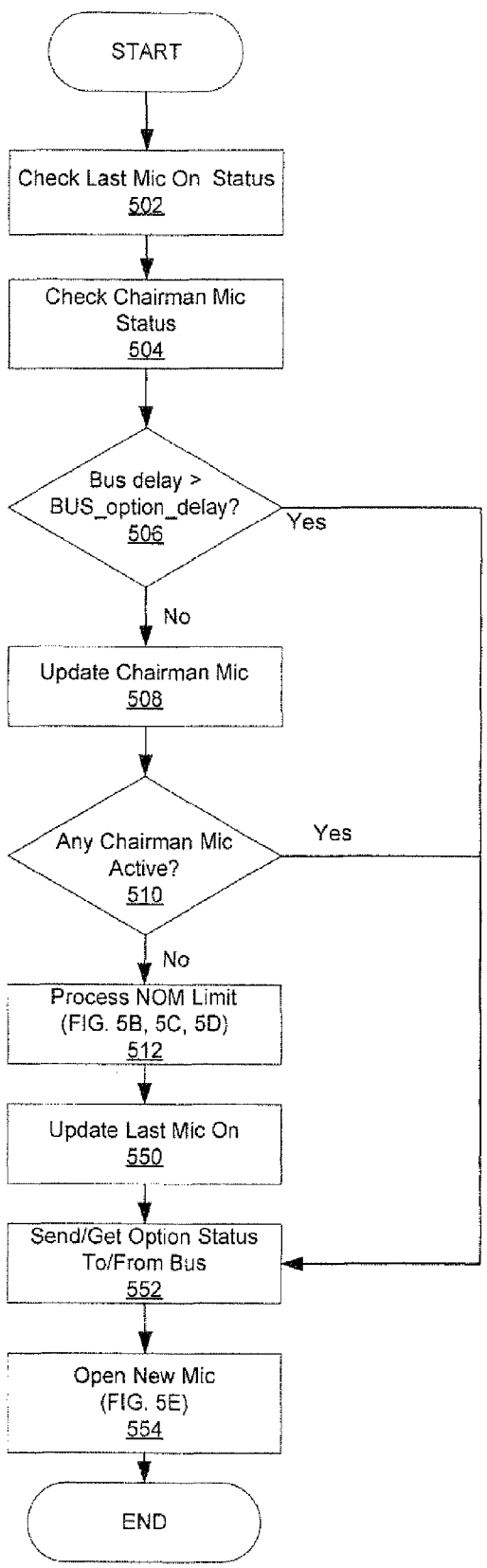
FIG. 5A is an exemplary flow chart of a control logic module for processing an auto-mixer options.

Once the state machine 206 determines which microphones are eligible to be opened due to their long term or short term speech levels, the option control logic module 204 (FIG. 2A) further processes these gating decisions according to any user settings which may restrict which microphones can be gated open or closed. FIG. 5A illustrates an exemplary process performed by the control logic module 204 for determining options within an exemplary system of the present invention.

Referring now to FIG. 5A, an exemplary flow chart of option control is shown. The option control logic module 204 (FIG. 2A) cycles through several user-definable options for gating logic. In step 502, the option control logic module 204 determines whether any local microphones are held open due to a "last mic on" condition. Next, the option control logic module 204 determines whether any local microphones configured as chairman microphones are open in step 504. After establishing a delay period in order to synchronize the state machine 206 (FIG. 2A) with data received from the bus 132 (FIG. 1), the system compares these values to those provided by other external auto-mixers in step 506. If the bus 132 delay is greater than a bus-communicated option for delay (BUS_option_delay), then the option control logic module 204 sends or receives an option control status via the bus 132 in step 552, for interfacing with remote devices such as the remote auto-mixers 106 and 108 (FIG. 1), assuming the option control module 204 is within local auto-mixers 102 or 104. If the bus 132 delay is not greater than the bus-communicated option for delay (BUS_option_delay), then the option control logic module 204 updates the chairman microphone status in step 508. Further, the option control logic module 204 determines whether a chairman microphone is active in step 510.

An exemplary embodiment of the present invention checks whether any local or external chairman microphones are open. If a chairman microphone is active, then this option is communicated over the bus 132 to all auto-mixers in step 552. If no chairman microphones are active, then the option control logic module 204 processes a NOM limit in step 512, which will be described in greater detail below with regard to FIG. 5B. The option control logic module 204 updates a last microphone on status in step 550. If a local microphone is the only microphone in the system which is currently open, option control logic module 204 may leave this microphone open indefinitely (last mic on), until another microphone in the system opens at which point the last microphone on would turn off (assuming there is no additional activity at that microphone). The option control logic module 204 communicates an option status to other auto-mixers via the bus 132 (FIG. 1). Finally, in step 554, option control logic module 204 opens a new microphone in response to the above-discussed process. The option control logic module 204 exchanges control data with other auto-mixers via the bus 132 and gates open any microphones that are allowed to turn on after this processing.

Figure 5B:
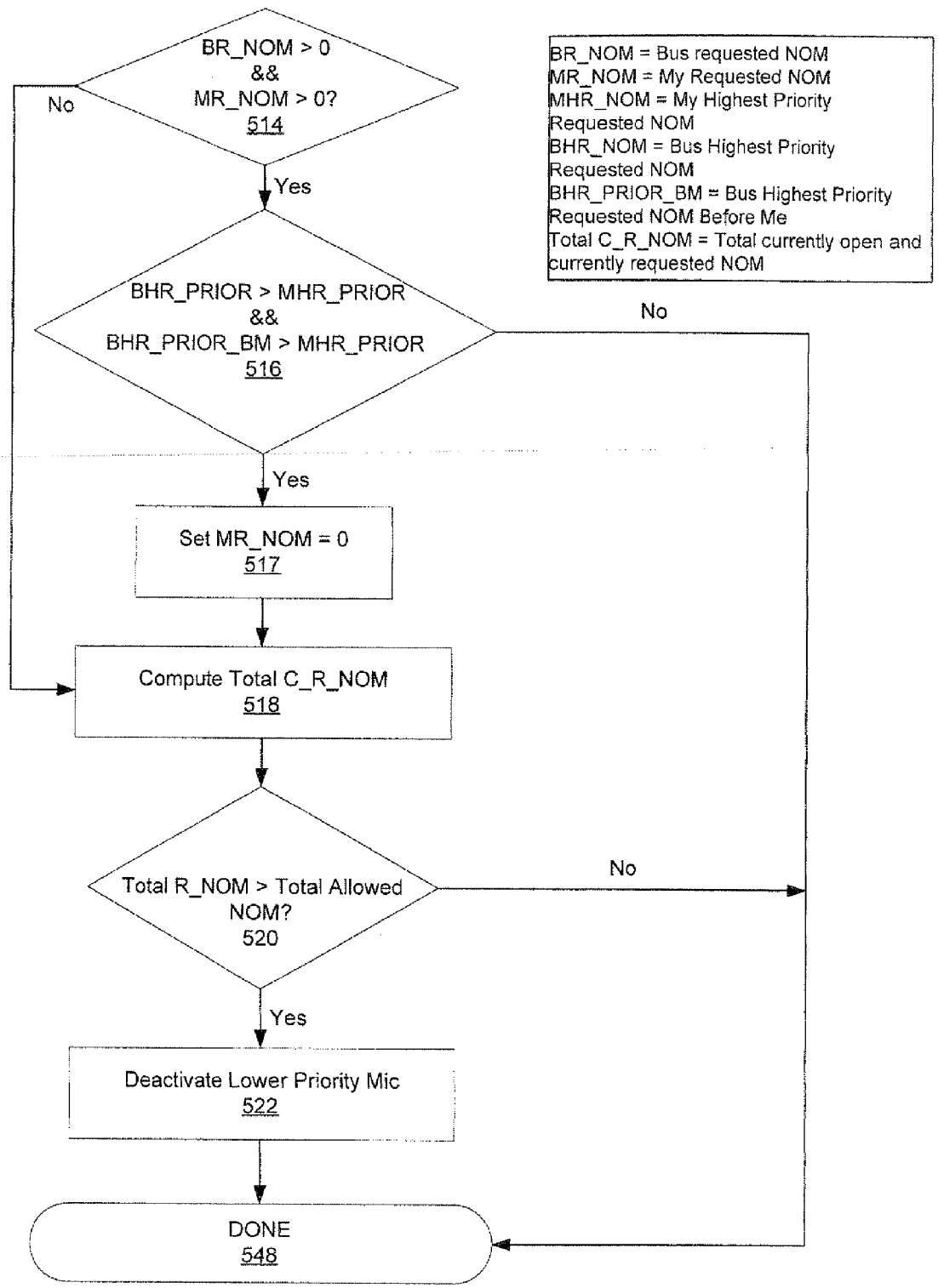
FIG. 5B is an exemplary flow chart of how a control logic module processes a NOM limit.

With regard to FIG. 5B, an exemplary flow chart of step 512 (FIG. 5A) is shown. When status is checked at a beginning of an option control logic process, the option control logic module 204 (FIG. 2A) first determines whether a microphone requests to be gated open in the local auto-mixer or on the bus 132 (FIG. 1) in step 514. To process the NOM limit, the first test is to determine whether a requested microphone in the local mixer is allowed to be turned on. Only one requested microphone in the system is allowed to be turned on in any given frame, to prevent two microphones from simultaneously opening and possibly exceeding the NOM limit. When a microphone requests to be gated open, the option control logic module 204 will turn off any microphones gated open solely due to a "last mic on" condition in steps 516-517.

The option control logic module 204 computes a total requested current NOM in step 518. The option control logic module 204 compares the total requested current NOM to a total allowed NOM in step 520. If the total requested current NOM is greater than the total allowed NOM, then the option control logic module 204 deactivates the lower priority microphone in step 522.

Returning to FIG. 5A, if no microphones are currently gated open in the local auto-mixer or on the bus 132, and no other auto-mixers on the bus 132 have a "last mic on" condition enabled, the local auto-mixer enables its "last mic on" condition. Returning to step 550 (FIG. 5A), the local auto-mixer gates open one microphone depending on its "last mic on" settings (either a particular user-defined default microphone, or the last microphone that was on due to speech signal activity).

If both the local auto-mixer and one or more remote auto-mixers request to gate open microphones, the local microphone will be designated the highest priority requested microphone in order to be open. Where multiple auto-mixers request to gate open microphones having a same priority, the auto-mixer with the lowest auto-mixer ID number receives priority for gating open. If the local microphone is not the highest priority, the option control logic module 204 does not gate open the local microphone during this frame (but may gate open during a later frame if the local microphone is still active). Next, the option control logic module 204 compares the current sum of all currently open and requested microphones to the global NOM limit for the bus 132. If too many microphones are open or request to be open, the option control logic module 204 selects microphones and assigns priorities for gating open (either preventing low priority microphones from opening, or turning off low priority microphones to allow a high priority microphone to open). If, after processing the NOM limit the option control logic module 204 permits the local requested microphone to gate open, the local microphone is gated open at step 554 (FIG. 5A), the "open new mic" phase of the option control logic process.

Figure 5C:
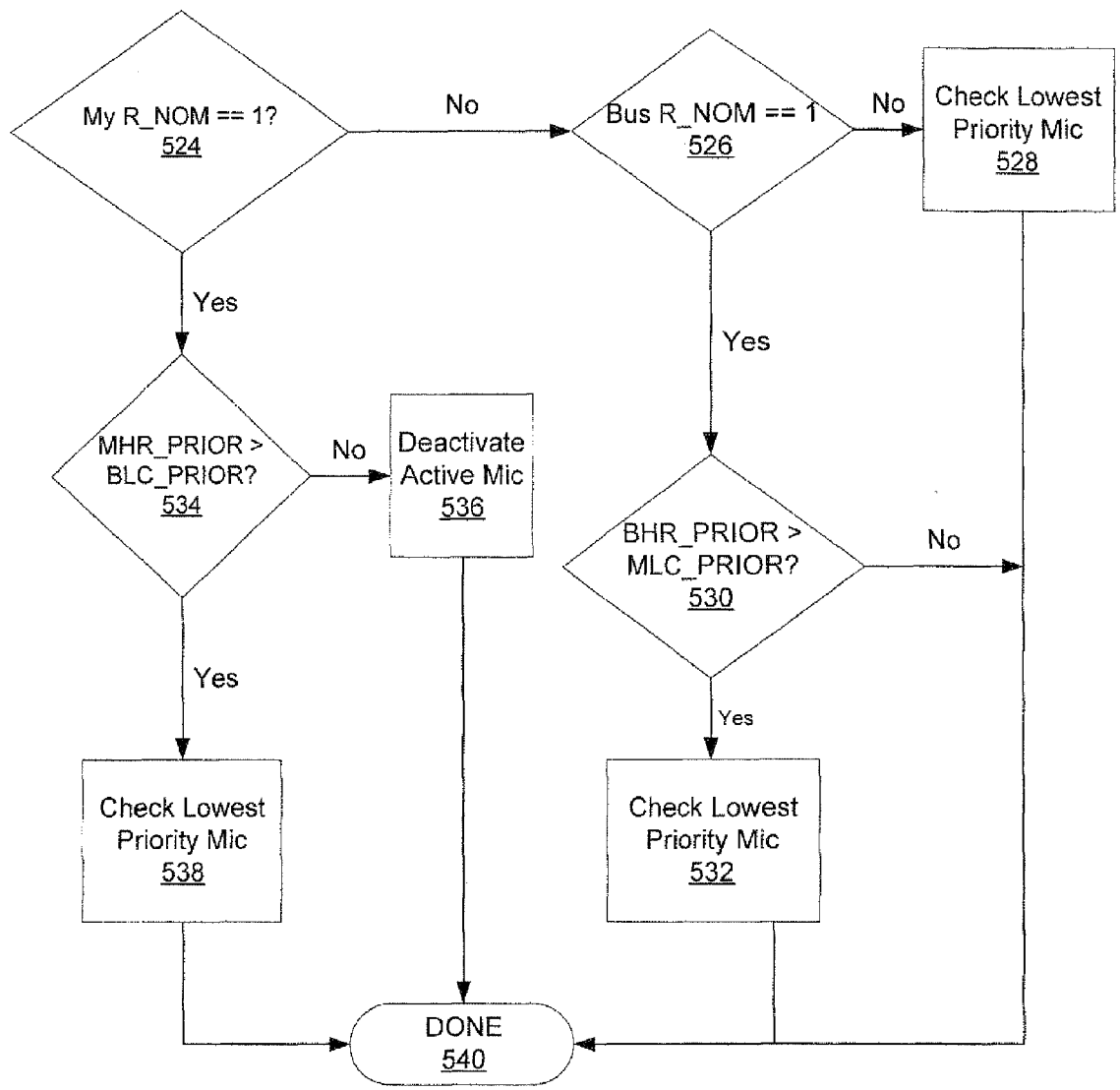
FIG. 5C is an exemplary flow chart of how a NOM limiter deactivates a microphone with lower priority.

Referring to FIG. 5C, an exemplary flow chart of step 522 (FIG. 5B) is shown. If there are no other open microphones other than a local microphone (My R_NOM=1), then the option control logic module 204 (FIG. 2) can open higher priority microphones while inhibiting lower priority microphones (references to "my" refer to local parameters). The option control logic module 204 determines whether a local requested NOM (My_RNOM) is equal to "1" ("1" is equal to "yes") in step 524. If the local requested NOM is not equal to "1" then the option control logic module 204 determines whether a bus-communicated NOM is equal to 1 in step 526. If the bus-communicated requested NOM is not "1," then the option control logic module 204 checks a lowest priority microphone in step 528. Alternatively, if the bus-communicated requested NOM equals 1, then the option control logic module 204 compares a base highest requested priority with a lowest current priority in step 530. If the base highest requested priority is greater than the lowest current priority, then the option control logic module 204 checks the lowest priority microphone in step 532.

If the local requested NOM equals "1" in step 524, then the option control logic module 204 compares a local highest requested priority with a bus-communicated lowest requested priority in step 534. If the local highest requested priority is less than the bus-communicated lowest requested priority, then the option control logic module deactivates any active microphones in step 536. If the local highest requested priority is greater than the bus-communicated lowest requested priority, then the option control logic module checks the lowest priority microphone in step 538. The option control logic module 204 then returns to the main logic loop at step 550. In the above-process, the steps 528, 532, and 538 for checking for a lowest priority microphone are described in further detail with regard to FIG. 5D.

Figure 5D:
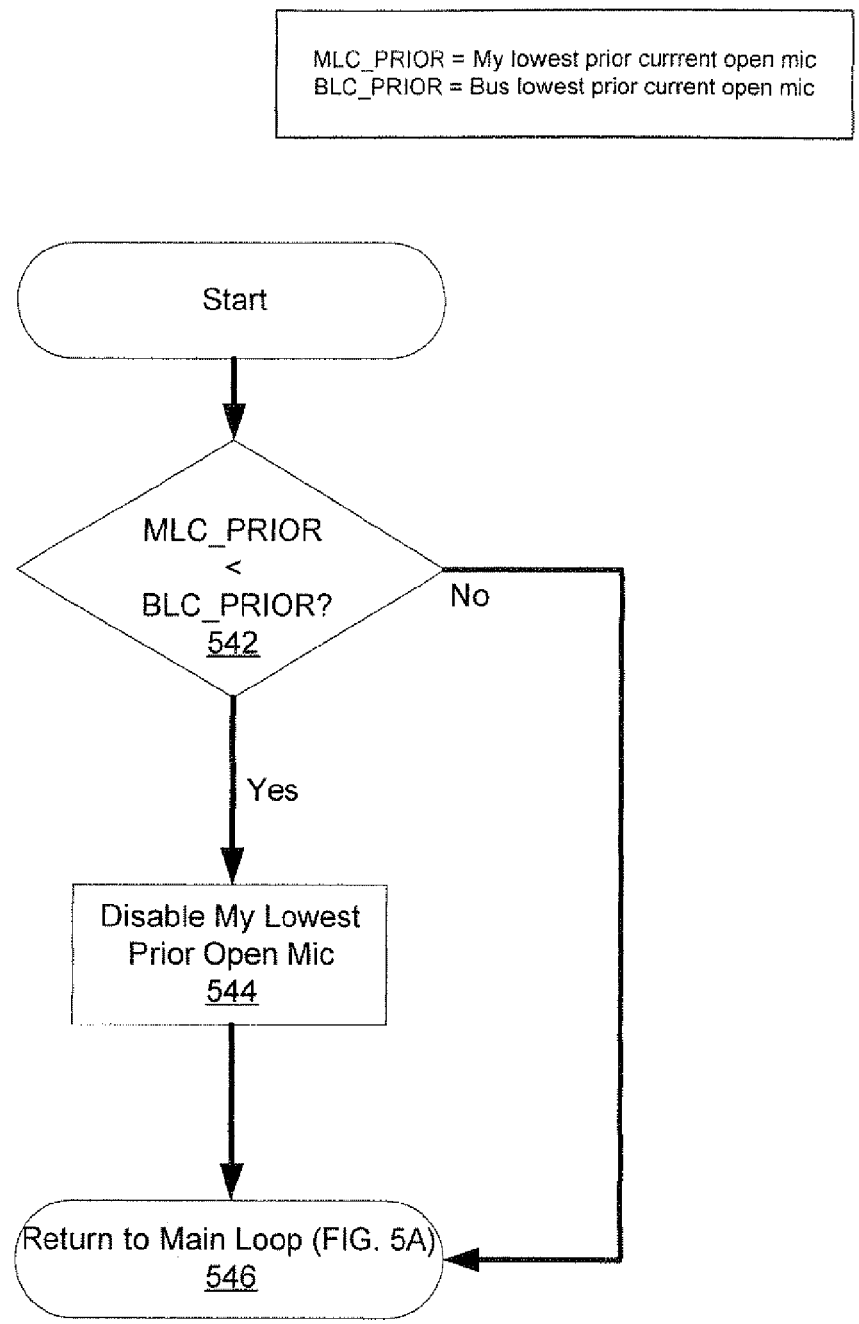
FIG. 5D is an exemplary flow chart showing how a control logic module checks for the lowest priority microphone.

To determine whether a local low priority microphone should be deactivated, the lowest currently open priority local microphone is compared to the lowest currently open priority microphone on the bus 132 (FIG. 1) in step 542 of FIG. 5D. In step 544, if the local microphone has the lowest priority (using the auto-mixer number to break any ties), the local microphone will be deactivated. Otherwise, the local microphone will remain open and assume another auto-mixer will deactivate its lower priority microphone.

Figure 5E:
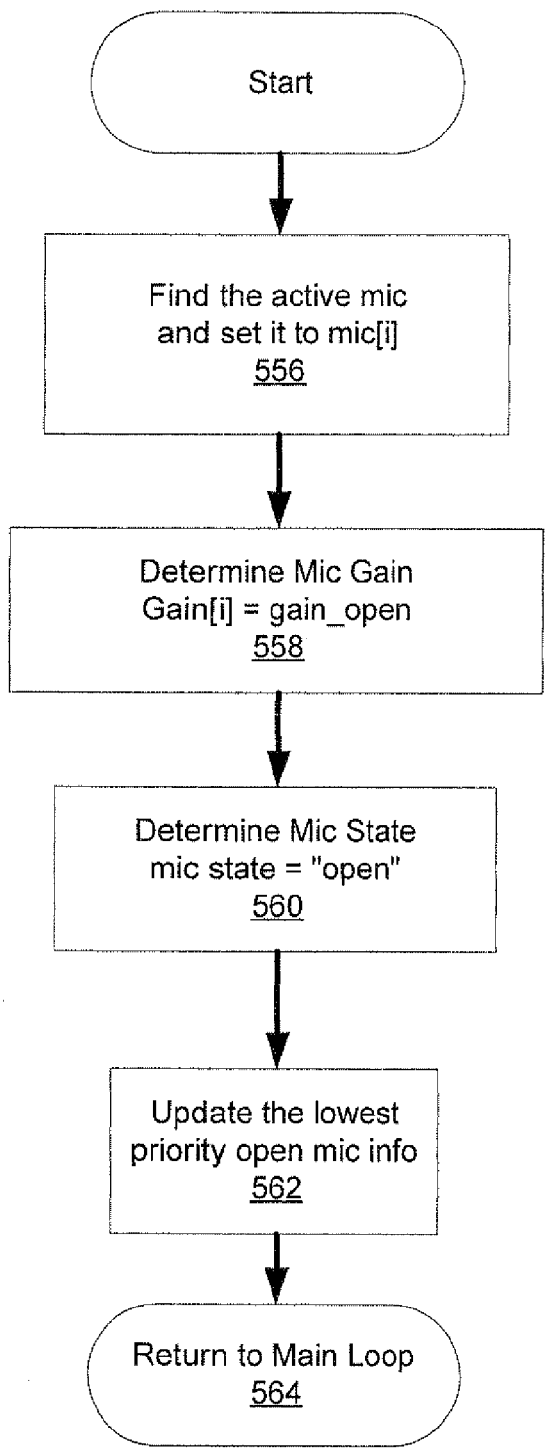
FIG. 5E is an exemplary flow chart showing how a control logic module opens a newly activated microphone.

Referring to FIG. 5E, an exemplary flow chart of step 554 (FIG. 5A) is shown. The "open new mic" stage of the option control logic determines which local microphone can be opened and, in this exemplary embodiment, sets microphone gain to 0 dB and gates the local microphone to the "open" state. Ultimately, the state machine 206 (FIG. 2A) will process hold time and decay time. Initially, the option control logic module 204 (FIG. 2A) finds the active microphone and sets the microphone to the ith index as the microphone under evaluation in step 556. The gain of the microphone under evaluation is made equal to the value for gating the microphone to an open state, which is "1" in step 558. Next, the microphone state is made equal to open in step 560, thus gating the microphone under evaluation to an open state. The option control module 204 then updates information related to the lowest priority open microphone in step 562. Finally, the option control logic module 204 then returns to the main logic loop of FIG. 5A in step 564

The amount of data exchanged between auto-mixers can be varied. Each auto-mixer, according to one exemplary embodiment, sends the following values on the bus 132 (FIG. 1):

Max long term level (32 bits)
Max short term level (32 bits)
Chairman active (1 bit)
Last mic on active (1 bit)
Total requested NOM (Nm bits)
Total current NOM (Nm bits)
Highest requested priority (Np bits)
Lowest current on priority (Np bits)
Mixer group (Ng bits)

Nm is the number of bits needed to represent the maximum number of microphones in each auto-mixer. Np is the number of bits needed to represent all available levels of priority, and Ng is the number of bits needed to represent all available auto-mixer groups. For example, with 8 microphones per auto-mixer, four levels of priority, and 8 bus auto-mixer groups, Nm, Np and Ng would be 3, 2, and 3 respectively. The data is generated by each auto-mixer and communicated over the bus 132 (FIG. 1). The IMA 202 (FIG. 2A) uses this data from the bus 132 and all local mixers to provide the parameters for each local auto-mixer.

The above description is illustrative and not restrictive. Many variations of the invention will become apparent to those of skill in the art upon review of this disclosure. For examples, the steps described in the above flow charts may be performed in a different order or not all steps may be performed. The scope of the invention should, therefore, be determined not with reference to the above description, but instead should be determined with reference to the appended claims along with their full scope of equivalents.

What is claimed is:

1. A system for managing microphone signals, comprising:
   a plurality of auto mixers each for managing a plurality of microphone signals, each microphone signal corresponding to a microphone, each auto mixer providing a digital output signal;
   a plurality of inter mixer arbitrators each coupled to and receiving the digital output signal from at least one auto mixer for arbitrating the plurality of microphone signals; and
   a digital bus for transmitting the plurality of microphone signals between the plurality of inter mixer arbitrators.

2. The system of claim 1, wherein the auto mixer comprises a state machine for determining a state for the at least one microphone.

3. The system of claim 1 wherein the auto mixer comprises an option control logic module for determining options for at least one of the microphones.

4. The system of claim 1, wherein the inter mixer arbitrator comprises a NOM module for evaluating a NOM count.

5. The system of claim 1, wherein the inter mixer arbitrator comprises a speech level module for evaluating a speech level and a noise level within the plurality of microphone signals.

6. The system of claim 1, wherein the inter mixer arbitrator comprises a priority module for evaluating a priority option for at least one of the microphones.

7. The system of claim 1, wherein the inter mixer arbitrator comprises an options module for evaluating an option for the microphone.

8. A distributed method of managing microphone signals, the method comprising:
   receiving a plurality of local microphone signals at a local auto-mixer, each of the local microphone signals corresponding to one of a plurality of local microphones;
   outputting a digital local auto-mixer signal from the local auto-mixer to a local inter-mixer arbitrator;
   receiving a plurality of remote microphone signals at a remote auto-mixer, each of the remote microphone signals corresponding to one of a plurality of remote microphones;
   outputting a digital remote auto-mixer signal from the remote auto-mixer to the local inter-mixer arbitrator; and
   digitally arbitrating, at the local inter-mixer arbitrator, microphone signals for the local mixer and the remote mixer by determining a state and an option for each of the microphones from the digital local auto-mixer signal and the digital remote auto-mixer signal.

9. The method of claim 8, further comprising providing one or more gated output signals of the local auto-mixer.

10. The method of claim 9, further comprising mixing the one or more gated output signals of the local auto-mixer based on the digitally arbitrating.

11. The method of claim 8, wherein digitally arbitrating comprises gating a particular microphone closed if a level of the microphone signal of that microphone is less than a threshold noise floor level.

12. The method of claim 8, wherein determining the state comprises determining a primary microphone from a histogram of long term data.

13. The method of claim 12, wherein determining the primary microphone from the histogram of long term data comprises determining an activity measurement for the microphone based on a comparison of a set of long term data of the histogram.

14. The method of claim 8, wherein determining the state comprises determining zero or more secondary microphones from a histogram of short term data.

15. The method of claim 14, wherein determining zero or more secondary microphones from the histogram of short term data comprises determining an activity measurement for the microphone based on a comparison of a set of short term data of the histogram.

16. The method of claim 8, wherein determining the option comprises determining a NOM count.

17. The method of claim 16, wherein determining the NOM count comprises:
   comparing a local current NOM count with a bus current NOM count for said auto-mixer; and
   comparing a local requested NOM count with a bus requested NOM count.

18. The method of claim 8, wherein determining the state comprises selecting a speech level corresponding to a microphone.

19. The method of claim 18, wherein selecting the speech level corresponding to the microphone comprises selecting a maximum speech level based on a bus long term speech level equalized with a local long term speech level if the bus long term speech level is greater than the local long term speech level.

20. The method of claim 18, wherein selecting the speech level corresponding to the microphone comprises selecting a short term speech level based on a bus short term speech level equalized with a local short term speech level.

21. The method of claim 8, wherein determining the option comprises selecting a priority corresponding to the microphone.

22. The method of claim 8, wherein digitally arbitrating comprises updating a set of parameters in an auto mixer.

23. The method of claim 8, wherein determining the option comprises determining a chairman microphone.

24. The method of claim 8, wherein determining the option comprises determining a last microphone used.

25. A distributed system for managing microphone signals, the system comprising:
   a local auto-mixer for managing a plurality of local microphone signals, each local microphone signal corresponding to a local microphone;
   a remote auto-mixer for managing a plurality of remote microphone signals, each remote microphone signal corresponding to a remote microphone;
   a local inter-mixer arbitrator for digitally arbitrating the microphone signals for the local auto-mixer and the remote auto-mixer by determining a state and an option for each microphone; and
   a digital bus coupling the inter-mixer arbitrator and the remote auto-mixer;
   wherein the local inter-mixer arbitrator is digitally connected to the local auto-mixer.

26. The system of claim 25 wherein each auto-mixer comprises a state machine for determining the state for each microphone.

27. The system of claim 25, wherein each auto-mixer comprises an option control logic module for determining the option for each microphone.

28. The system of claim 25, wherein the inter-mixer arbitrator comprises a NOM module for evaluating a NOM count.

29. The system of claim 25, wherein the inter-mixer arbitrator comprises a speech level module for evaluating a speech level and a noise level within the plurality of microphone signals.

30. The system of claim 25, wherein the option comprises a priority option for each microphone.

31. The system of claim 25, wherein the inter-mixer arbitrator comprises an options module for evaluating an option for the microphone.

* * * * *